(12) United States Patent
Kuroki

(10) Patent No.: US 10,336,418 B2
(45) Date of Patent: Jul. 2, 2019

(54) SHOCK ABSORBER FOR PROPELLER UNIT, PROPELLER UNIT, AND VESSEL PROPULSION APPARATUS

(71) Applicant: YAMAHA HATSUDOKI KABUSHIKI KAISHA, Iwata-shi, Shizuoka (JP)

(72) Inventor: Yohei Kuroki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 154 days.

(21) Appl. No.: 15/353,838

(22) Filed: Nov. 17, 2016

(65) Prior Publication Data
US 2017/0066516 A1    Mar. 9, 2017

Related U.S. Application Data

(62) Division of application No. 14/159,629, filed on Jan. 21, 2014, now Pat. No. 9,840,314.

(30) Foreign Application Priority Data

Jan. 22, 2013    (JP) .................................. 2013-009284

(51) Int. Cl.
B63H 1/15    (2006.01)
B63H 1/20    (2006.01)
(Continued)

(52) U.S. Cl.
CPC ................. B63H 1/15 (2013.01); B63H 1/20 (2013.01); B63H 20/14 (2013.01); B63H 23/34 (2013.01);
(Continued)

(58) Field of Classification Search
CPC ........... B63H 1/14; B63H 23/24; F16D 47/02; F16D 9/06; F16D 3/68
See application file for complete search history.

(56) References Cited

U.S. PATENT DOCUMENTS

| | | | | |
|---|---|---|---|---|
| 6,659,818 B2 * | 12/2003 | Booe | ...................... | B63H 23/34 416/134 R |
| 6,685,432 B2 * | 2/2004 | Chen | ........................ | B63H 1/20 416/134 R |

(Continued)

FOREIGN PATENT DOCUMENTS

EP    1 219 534 A2    7/2002
JP    2000280983 A  * 10/2000

OTHER PUBLICATIONS

JP 2000280983 A English Translation.*

(Continued)

*Primary Examiner* — Mark A Laurenzi
*Assistant Examiner* — Shafiq Mian
(74) *Attorney, Agent, or Firm* — Keating and Bennett, LLP

(57) ABSTRACT

A damper is disposed between an outer peripheral surface of a bushing and an inner peripheral surface of an inner hub. The damper includes a first portion facing a rib of the bushing, a second portion facing a rib of the inner hub, and a connection portion by which the first portion and the second portion are connected to each other. In a state in which a rotational force has not been applied between the bushing and the inner hub, the damper includes a cross-sectional shape that defines a deformation-absorbing space positioned between the first portion and the second portion. The deformation-absorbing space is deformed such that the first portion approaches the second portion in a state in which the rib of the bushing and the rib of the inner hub have moved relatively by application of a rotational force between the bushing and the inner hub.

21 Claims, 25 Drawing Sheets

(51) Int. Cl.
    *F16D 3/12* (2006.01)
    *B63H 23/34* (2006.01)
    *B63H 20/14* (2006.01)
    *F16F 15/124* (2006.01)

(52) U.S. Cl.
    CPC ............ *F16D 3/12* (2013.01); *F16F 15/1245* (2013.01); *B63H 2023/344* (2013.01)

(56) References Cited

U.S. PATENT DOCUMENTS

| | | | |
|---|---|---|---|
| 2003/0153218 A1 | 8/2003 | Booe | |
| 2006/0263219 A1* | 11/2006 | Dean | B63H 1/20 416/134 R |
| 2010/0130078 A1* | 5/2010 | Okabe | B63H 20/14 440/75 |

OTHER PUBLICATIONS

Kuroki, "Shock Absorber for Propeller Unit, Propeller Unit, and Vessel Propulsion Apparatus", U.S. Appl. No. 14/159,629, filed Jan. 21, 2014.

* cited by examiner

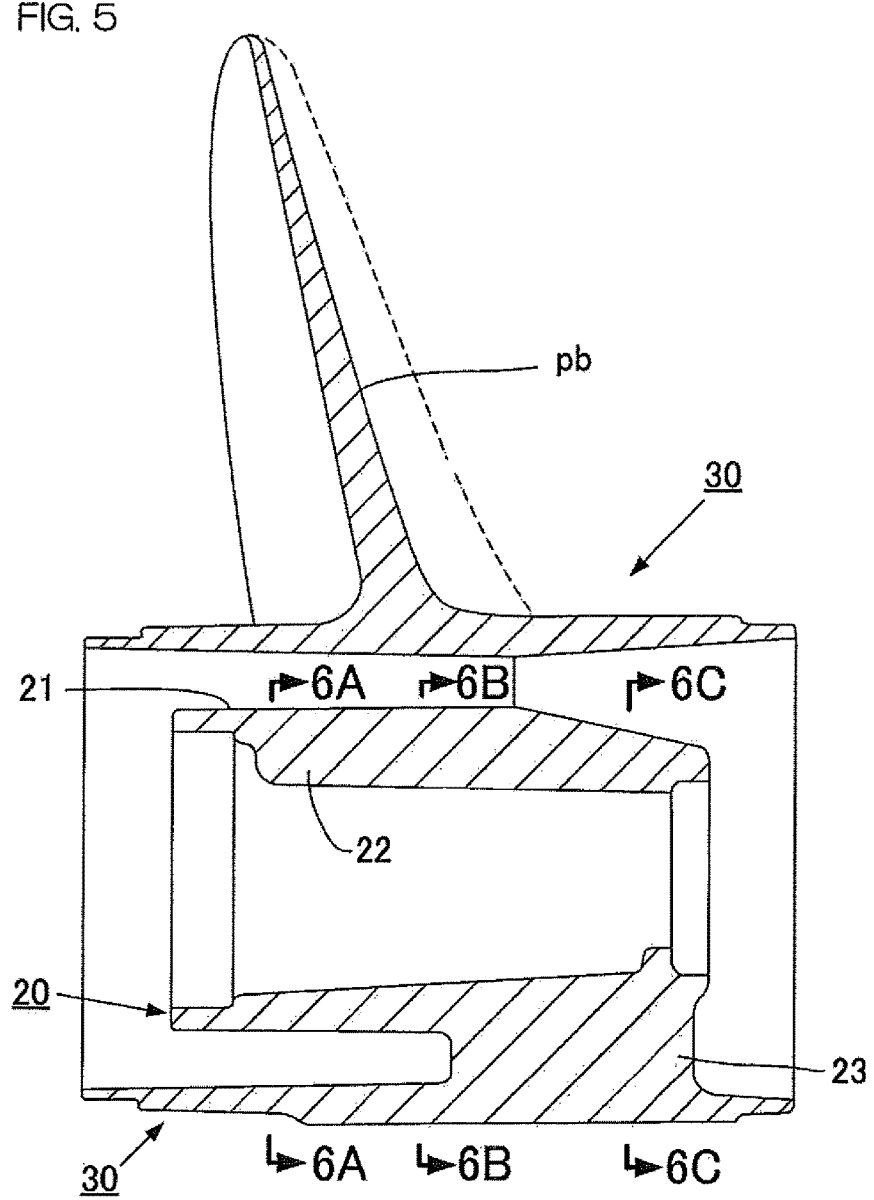

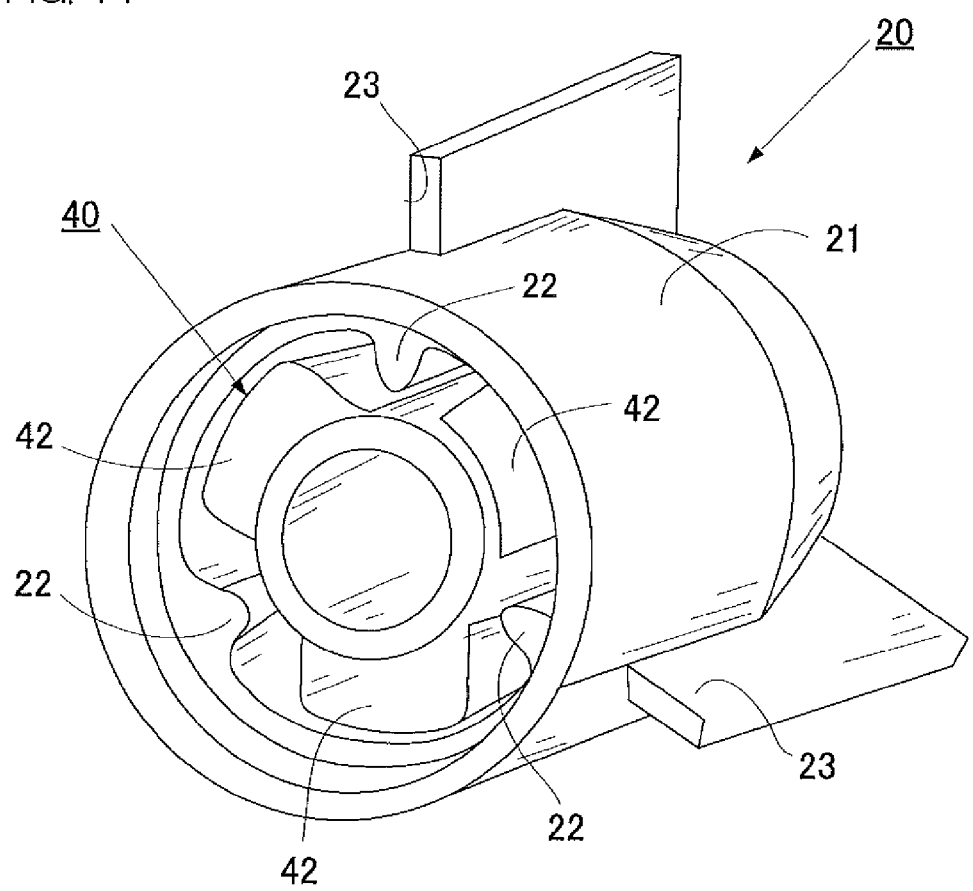

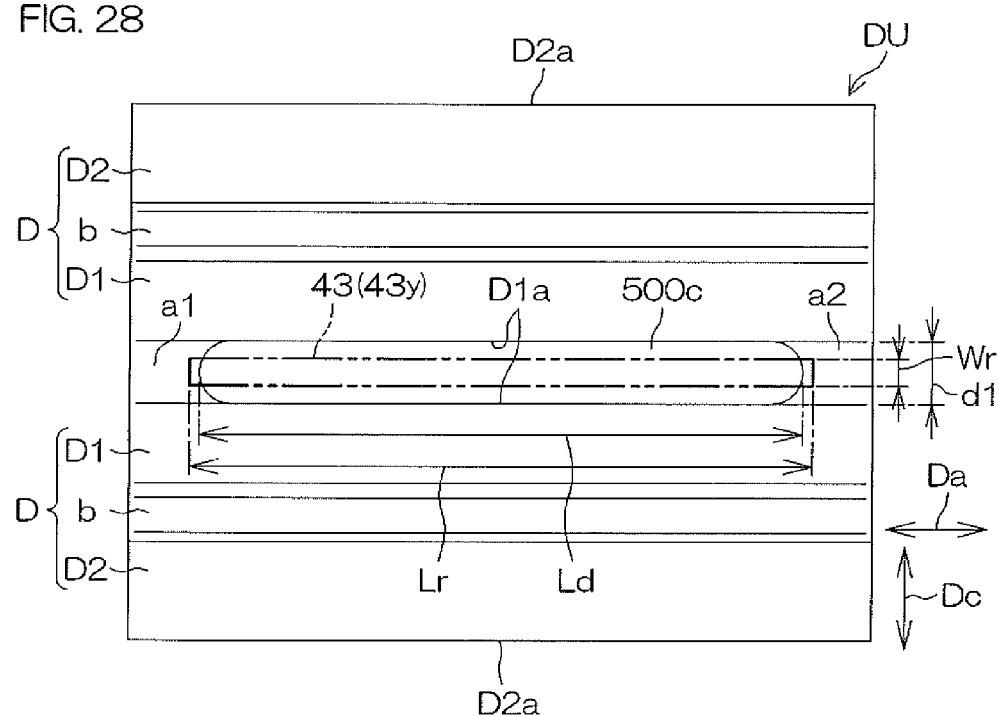
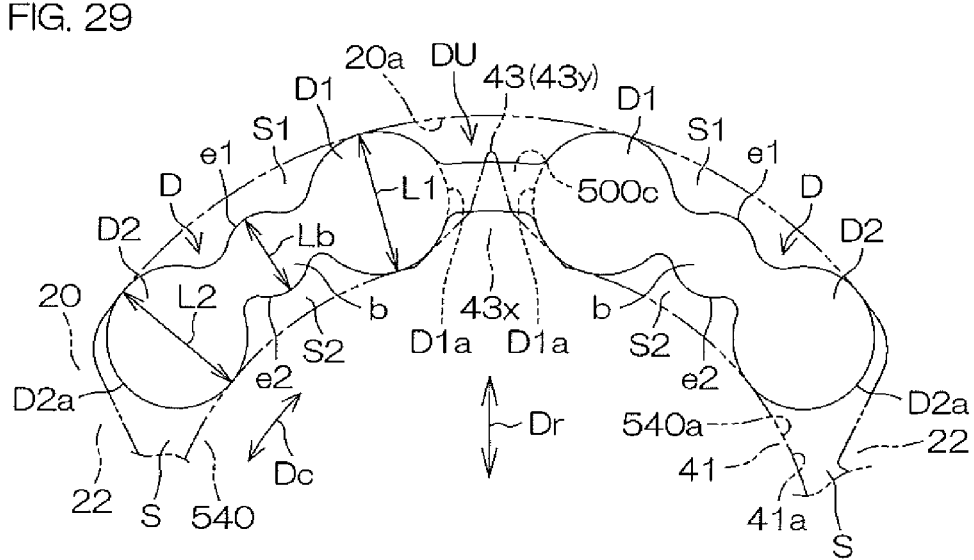

SHOCK ABSORBER FOR PROPELLER UNIT, PROPELLER UNIT, AND VESSEL PROPULSION APPARATUS

BACKGROUND OF THE INVENTION

1. Field of the Invention

The present invention relates to a propeller unit that is connected to a propeller shaft of a vessel propulsion apparatus, to a shock absorber that is installed in the propeller unit, and to the vessel propulsion apparatus that includes the propeller unit.

2. Description of the Related Art

A propeller unit of a vessel propulsion apparatus includes an outer hub that includes a plurality of blades provided on an outer peripheral surface of the outer hub, an inner hub that is coaxially connected to an inner side of the outer hub, a bushing that is connected to a propeller shaft, and a damper that is disposed between the bushing and the inner hub and that is made of an elastic material such as rubber. A driving force transmitted from the propeller shaft is transmitted to the outer hub through the bushing, the damper, and the inner hub. As a result, the blades disposed at the outer hub rotate, and thrust is transmitted to a vessel.

There is a case in which an outboard motor that is one example of the vessel propulsion apparatus includes a shift mechanism by which a propulsion direction is switched between a forward direction and a backward direction. This shift mechanism includes a dog clutch, a forward gear, and a backward gear. The propeller shaft is spline-coupled with the dog clutch and the dog clutch is arranged so as to selectively engage the forward gear and the backward gear. The rotation of a drive shaft that transmits a driving force of an engine is always transmitted to the forward gear and to the backward gear. The forward gear and the backward gear are rotated in mutually opposite directions by a driving force from the drive shaft. When the dog clutch engages the forward gear, the blades disposed at the outer hub rotate in a direction in which the vessel is propelled forwardly. When the dog clutch engages the backward gear, the blades rotate in a direction in which the vessel is propelled backwardly. When the dog clutch is in a neutral state in which the dog clutch engages neither the forward gear nor the backward gear, a driving force of the engine is not transmitted to the blades.

When the dog clutch moves from a neutral position to an engaging position, an impact sound and vibrations are generated. These impact sound and vibrations result from a speed difference in the rotational direction between the forward or backward gear and the propeller shaft, and result from a rotational portion including the propeller having a great inertial mass. The neutral position is a position in which the dog clutch engages neither the forward gear nor the backward gear. The engaging position is a position in which the dog clutch engages either the forward gear or the backward gear. The rotational portion includes the propeller and a portion that rotates together with the propeller.

Particularly in a state in which the propeller unit is not rotating and the dog clutch is moved from the neutral position to the engaging position, a great shock occurs, and a great sound is generated. Likewise, at a shift-out time at which the dog clutch is moved from the engaging position to the neutral position, a great shock occurs, and a great sound is generated, although the shock at the shift-out time is smaller than a shock at the shift-in time at which the dog clutch is moved from the neutral position to the engaging position.

To lessen these shocks and sounds, a propeller unit has been proposed in which a damper made of an elastic material such as rubber is disposed between a bushing and an inner hub as described above.

For example, U.S. Pat. No. 5,049,034 discloses a propeller unit in which a shock absorber is disposed between a bushing and an inner hub. This shock absorber includes a plurality of cylindrical members each of which is made of an elastic material. Each cylindrical member is disposed between an outer peripheral surface of the bushing and an inner peripheral surface of the inner hub. In this state, each cylindrical member is disposed between an outer projecting rib provided at the outer peripheral surface of the bushing and an inner projecting rib provided at the inner peripheral surface of the inner hub.

U.S. Pat. Nos. 6,471,481 and 6,685,432 also disclose a propeller unit in which a shock absorber is disposed between a bushing and an inner hub. This shock absorber includes a cylindrical member made of an elastic material. This cylindrical member is disposed between a bushing and an inner hub. The cylindrical member includes a key way that extends from one end portion of the cylindrical member in an axial direction and a key way that extends from the other end portion of the cylindrical member in the axial direction. The key way extending from the one end portion of the cylindrical member and the key way extending from the other end portion of the cylindrical member are arranged alternately in a circumferential direction of the cylindrical member. The outer projecting rib provided at the outer peripheral surface of the bushing is fitted to the key way extending from the one end portion of the cylindrical member, whereas the inner projecting rib provided at the inner peripheral surface of the inner hub is fitted to the key way extending from the other end portion of the cylindrical member.

U.S. Pat. No. 6,659,818 also discloses a propeller unit in which a shock absorber is disposed between a bushing and an inner hub. This shock absorber is made of an elastic material. The shock absorber includes a plurality of cylindrical members arranged in parallel with each other at predetermined intervals therebetween, a first connection member by which one endportion of one of the cylindrical members is connected to one end of portion another cylindrical member in an alternate manner, and a second connection member by which one opposite end portion of the one cylindrical member is connected to one opposite end portion of the another cylindrical member in an alternate manner. Each cylindrical member is disposed between the bushing and the inner hub. In this state, each cylindrical member is disposed between a rib provided at an outer peripheral surface of the bushing and a rib provided at an inner peripheral surface of the inner hub.

U.S. Pat. No. 7,223,073 discloses a propeller unit in which a shock absorber is disposed between a bushing and an inner hub. This shock absorber is made of an elastic material. The shock absorber includes a pair of cylindrical members and a belt-shaped member by which the pair of cylindrical members are connected to each other. Each cylindrical member is disposed between an outer peripheral surface of the bushing and an inner peripheral surface of the inner hub. The cylindrical member is furthermore disposed between an outer projecting rib provided on the bushing and an inner projecting rib provided on the inner hub. The belt-shaped member is disposed between the outer projecting rib of the bushing and the inner peripheral surface of the inner hub.

In every one of the above propeller units, the shock absorber is interposed between the outer projecting rib of the bushing and the inner projecting rib of the inner hub, and thus a shock is lessened, and an impact sound is lowered when the bushing rotates relatively to the inner hub.

In every one of the above propeller units, it is possible to lessen a shock or a sound generated when the dog clutch shifts in the forward gear or the backward gear and when the dog clutch shifts out from the forward gear or from the backward gear. However, a shock lessening effect and an impact sound reducing effect have not necessarily been satisfactory.

Additionally, there is a case in which the dog clutch generates vibrations or a sound at a time excluding the shift-in time or the shift-out time, i.e., the dog clutch generates vibrations or a sound even when the dog clutch is in engagement the forward gear or the backward gear. This results from the fact that the rotation of a drive shaft driven by an engine pulsates and the fact that the pulsations of the rotating drive shaft are transmitted to the propeller shaft.

In other words, a rotational portion including the propeller, i.e., the propeller and a portion rotating together with the propeller have a great inertial mass, and thus attempt to rotate at a constant speed. Therefore, the dog clutch that is spline-coupled with the propeller shaft also attempts to rotate at a constant speed. On the other hand, the rotation of the forward gear and the backward gear engaging the dog clutch pulsates in accordance with the pulsations of the rotating drive shaft. Therefore, there is a case in which the pulsations of the rotating drive shaft cause vibrations or sounds between the dog clutch and a gear engaging the dog clutch. Vibrations and sounds generated in a state in which the dog clutch engages the forward gear or the backward gear in this way occasionally give users uncomfortable feelings particularly when a surrounding environment is quiet. These vibrations and sounds have not been satisfactorily prevented or eliminated in each of the above propeller units.

SUMMARY OF THE INVENTION

Preferred embodiments of the present invention effectively moderate and lessen a shock and a sound generated at, for example, at a shift-in time and a shift-out time.

A preferred embodiment of the present invention provides a shock absorber for a propeller unit driven by a propeller shaft of a vessel propulsion apparatus. The shock absorber includes a damper made of an elastic material. The damper is disposed between an outer peripheral surface of a bushing of the propeller unit and an inner peripheral surface of an inner hub of the propeller unit. The damper includes a first portion facing a rib of the bushing in a circumferential direction, a second portion facing a rib of the inner hub in the circumferential direction, and a connection portion by which the first portion and the second portion are connected to each other.

The damper defines a deformation-absorbing space between the first portion and the second portion in a state in which the damper has not been elastically deformed by relative rotation between the bushing and the inner hub.

The deformation-absorbing space is deformed such that the first portion and the second portion approach each other in a state in which the damper has been elastically deformed by relative rotation between the bushing and the inner hub.

In a preferred embodiment of the present invention, the damper may define a plurality of deformation-absorbing spaces that extend in an axial direction of the bushing.

In a preferred embodiment of the present invention, at least one of the first and second portions of the damper may be cylindrical or substantially cylindrical. In other words, both the first portion and the second portion may be cylindrical or substantially cylindrical, or only one of the first and second portions may be cylindrical or substantially cylindrical.

In a preferred embodiment of the present invention, in a cross-section perpendicular or substantially perpendicular to the axial direction of the bushing, a cross-sectional area of the deformation-absorbing space preferably falls within a range of about 30% to about 80% and, more preferably, within a range of about 40% to about 60% of a cross-sectional area of the damper, for example. The cross-sectional area of the deformation-absorbing space denotes, for example, the area of a cross-section perpendicular or substantially perpendicular to the axial direction of the bushing. The cross-sectional area of the damper denotes, for example, the area of a cross-section perpendicular or substantially perpendicular to the axial direction of the bushing.

In a preferred embodiment of the present invention, the plurality of dampers may be spaced apart in the circumferential direction of the bushing on the outer peripheral surface of the bushing.

In a preferred embodiment of the present invention, the shock absorber may include a pair of dampers that are disposed on the outer peripheral surface of the bushing and that are spaced apart in the circumferential direction of the bushing. In this case, in order to facilitate an attachment of the shock absorber with respect to the bushing, the shock absorber may be provided with a first connection arm by which first end portions of the pair of dampers in the axial direction of the bushing are connected to each other.

In a preferred embodiment of the present invention, the shock absorber for a propeller unit may further include, in addition to the pair of dampers and the first connection arm, a second connection arm by which second end portions of the pair of dampers in the axial direction of the bushing are connected to each other. The first end portion of the damper and the second end portion of the damper are end portions opposite to each other in the axial direction of the bushing.

In a preferred embodiment of the present invention, the shock absorber may be an integral and unitary cylindrical member in which the plurality of dampers are integrally connected to each other in the circumferential direction. In this case, the damper is easily attached to the bushing only by inserting the bushing into the single damper (cylindrical member).

No specific limitations are imposed on the cross-sectional shape of the deformation-absorbing space. For example, the deformation-absorbing space may include the following cross-sectional shapes.

More specifically, if the shock absorber is an integral and unitary cylindrical member in which the plurality of dampers are integrally connected to each other in the circumferential direction, the deformation-absorbing space may include a first concave portion that extends inwardly in the radial direction from an outer peripheral surface of the cylindrical member. The first concave portion may extend in the axial direction from the first end portion of the cylindrical member in the axial direction of the bushing toward the second end portion of the cylindrical member in the axial direction of the bushing.

If the shock absorber is an integral and unitary cylindrical member in which the plurality of dampers are integrally connected to each other in the circumferential direction, the deformation-absorbing space may include a second concave portion that extends outwardly in the radial direction from an inner peripheral surface of the cylindrical member. The second concave portion may extend in the axial direction from the first end portion toward the second end portion.

If the shock absorber is an integral and unitary cylindrical member in which the plurality of dampers are integrally connected to each other in the circumferential direction, the deformation-absorbing space may include a first concave portion that extends inwardly in the radial direction from the outer peripheral surface of the cylindrical member and that extends in the axial direction from the first end portion of the cylindrical member in the axial direction toward the second end portion of the cylindrical member in the axial direction, and a second concave portion that extends outwardly in the radial direction from the inner peripheral surface of the cylindrical member and that extends in the axial direction from the first end portion toward the second end portion.

If the shock absorber is an integral and unitary cylindrical member in which the plurality of dampers are integrally connected to each other in the circumferential direction, the damper may include a first concave portion that extends inwardly in the radial direction from the outer peripheral surface of the damper, and a second concave portion that extends outwardly in the radial direction from the inner peripheral surface of the damper. The first concave portion and the second concave portion may be spaced apart from each other in the circumferential direction. In this case, in a cross-section perpendicular or substantially perpendicular to the axial direction of the bushing, a cross-sectional area of the deformation-absorbing space preferably falls within a range of, for example, about 30% to about 80% of a space between the first concave portion and the second concave portion in the circumferential direction of the bushing.

Another preferred embodiment of the present invention provides a propeller unit connected to a propeller shaft of a vessel propulsion apparatus. The propeller unit includes an inner hub that includes a rib provided on an inner peripheral surface of the inner hub, an outer hub that is disposed and connected to the inner hub coaxially with the inner hub and that includes a plurality of blades provided on an outer peripheral surface of the outer hub, a bushing that includes a rib provided on the outer peripheral surface of the bushing and that is connected to the propeller shaft, and any one of the shock absorbers according to any of the preferred embodiments described above.

In another preferred embodiment of the present invention, the rib of the inner hub may have a cross-sectional shape that is tapered toward an inner end of the rib of the inner hub. In this case, in the cross-sectional shape of the rib of the inner hub, an additional deformation-absorbing space is provided. Therefore, it is possible to provide a propeller unit having a more excellent shock buffering effect and a more excellent impact sound reducing effect.

In another preferred embodiment of the present invention, the inner hub may include the plurality of ribs spaced apart in the circumferential direction. In this case, an impulsive force is dispersed by the plurality of ribs of the inner hub, and thus the strength and durability is improved.

In another preferred embodiment of the present invention, the bushing may include the plurality of ribs spaced apart in the circumferential direction. In this case, an impulsive force is dispersed by the plurality of ribs of the bushing, and thus the strength and durability is improved.

In another preferred embodiment of the present invention, the bushing may include spline teeth provided on the inner peripheral surface of the bushing. In this case, the bushing is spline-coupled with the propeller shaft. Therefore, the bushing is easily attached to the propeller shaft.

From the viewpoint of preventing the damper from being damaged by a great load imposed on the damper, it is preferable to arrange the bushing as follows.

In detail, in another preferred embodiment of the present invention, the bushing may further include a rotation restricting projection portion provided on the outer peripheral surface of the bushing. In this case, the rotation restricting projection portion restricts a relative movement between the rib of the bushing and the rib of the inner hub by coming into contact with the rib of the inner hub when the rib of the bushing and the rib of the inner hub relatively move in the circumferential direction by a predetermined distance. Preferably, the rotation restricting projection portion is arranged so as to come into contact with the rib of the inner hub before a load (critical load) great enough to break the damper is applied to the bushing. In other words, preferably, the rotation restricting projection portion is arranged so as to come into contact with the rib of the inner hub immediately before a load exceeding the critical load of the damper is applied to the bushing. The predetermined distance denotes a contact distance in which the rotation restricting projection portion and the rib of the inner hub come into contact with each other.

In another preferred embodiment of the present invention, the inner hub may include a flange that is disposed at a rear end portion of the inner hub and that extends inwardly in the radial direction. In this case, the inner hub restricts a movement of the bushing in the axial direction of the inner hub by contact between the flange and the bushing.

Still another preferred embodiment of the present invention provides a vessel propulsion apparatus including an engine, a drive shaft rotated by the engine, a drive gear fixed to the drive shaft, a forward gear engaging the drive gear, a backward gear that rotates in a direction opposite to a rotational direction of the forward gear while engaging the drive gear, a dog clutch that selectively engages the forward gear and the backward gear, a propeller shaft rotated together with the dog clutch, and any one of the propeller units according to any of the preferred embodiments described above connected to the propeller shaft.

The propeller unit according to at least one of the preferred embodiments of the present invention described above includes a damper made of an elastic material. The damper is disposed between the outer peripheral surface of the bushing and the inner peripheral surface of the inner hub. The damper includes the first portion facing the rib of the bushing in the circumferential direction, the second portion facing the rib of the inner hub in the circumferential direction, and the connection portion by which the first portion and the second portion are connected to each other. In a state in which the damper has not been elastically deformed by relative rotation between the bushing and the inner hub, the damper has a cross-sectional shape that defines a deformation-absorbing space positioned between the first portion and the second portion. In a state in which the damper has been elastically deformed by relative rotation between the bushing and the inner hub, the deformation-absorbing space is deformed such that the first portion and the second portion approach each other.

The damper includes the deformation-absorbing space as described above, and thus the shock absorbability of the damper disposed between the bushing and the inner hub is improved. Therefore, a shock generated when the dog clutch engages the forward gear or the backward gear is efficiently lessened, and a shock and a sound is effectively reduced.

Additionally, the damper effectively reduces vibrations or sounds between the dog clutch and the forward gear or the backward gear engaging the dog clutch, which results from pulsations of the drive shaft and the engine.

Additionally, the damper includes a shock absorption space, and thus the damper is detached and attached from and to the bushing more easily than a conventional damper that is press-fitted to a bushing. Therefore, the damper is easily replaced even if the shock absorbability of the damper is lowered by deterioration or being worn-out. Therefore, the entire propeller unit including the damper is not required to be replaced.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a cross-sectional view taken along line 5-5 in FIG. 4.

FIG. 11 is a perspective view showing a state in which the bushing has been fitted to the inner hub.

FIG. 28 is a view of the damper according to the fifth preferred embodiment of the present invention as seen in the radial direction from outside of the damper.

FIG. 29 is a view of the damper according to the fifth preferred embodiment of the present invention as seen in the axial direction.

DETAILED DESCRIPTION OF THE PREFERRED EMBODIMENTS

First Preferred Embodiment

Figure 1:
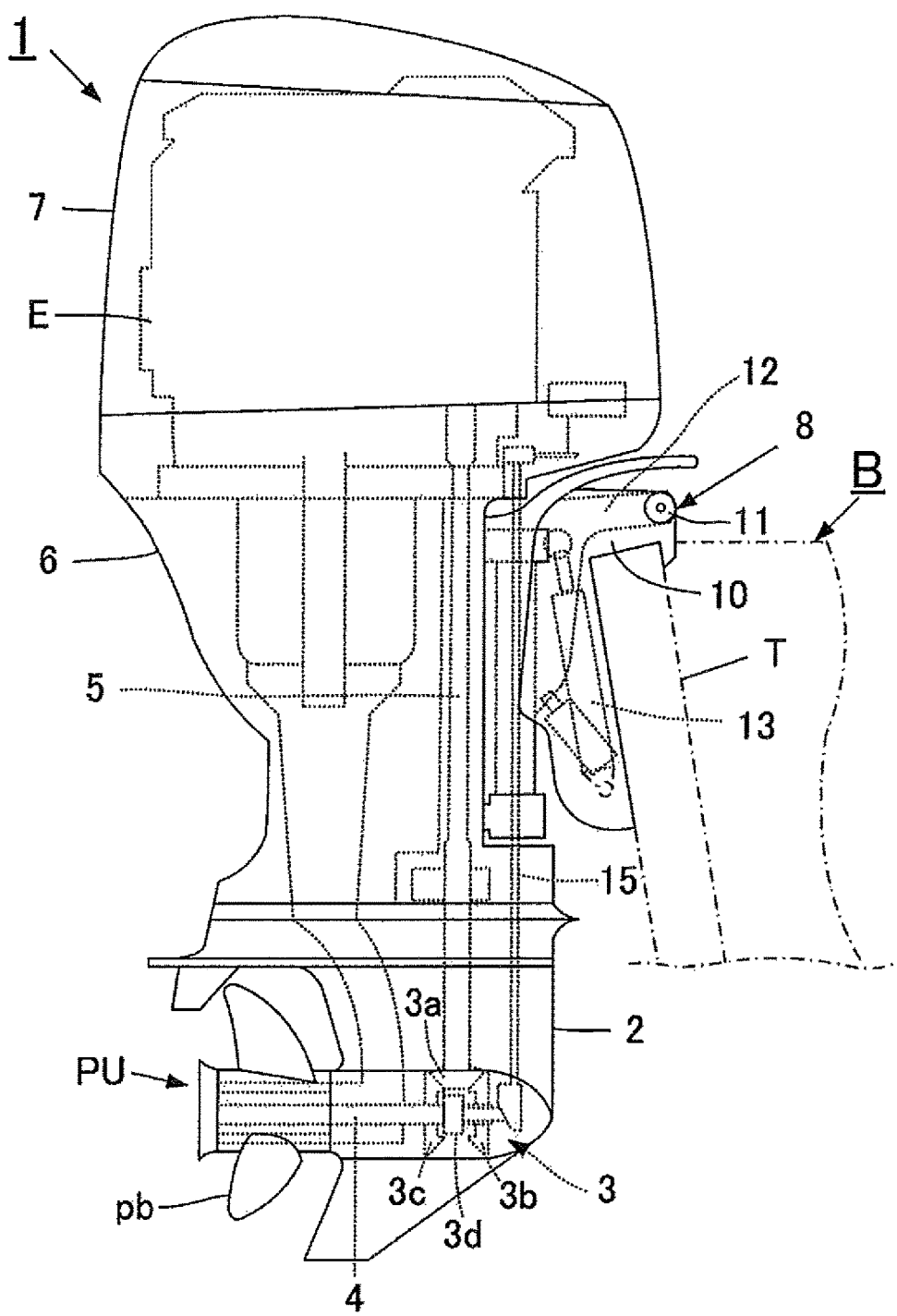
FIG. 1 is a side view showing a general structure of an outboard motor provided with a propeller unit according to a first preferred embodiment of the present invention.

FIG. 1 is a side view showing a general structure of an outboard motor provided with a propeller unit PU according to a first preferred embodiment of the present invention. As shown in FIG. 1, the outboard motor 1 includes a lower casing 2 disposed at a lower portion of the outboard motor 1. The propeller unit PU including a plurality of blades pb is attached to the lower casing 2. A shift mechanism 3 and a propeller shaft 4 are disposed in the lower casing 2. An upper casing 6 is disposed on the lower casing 2, and is fixed to the lower casing 2. A drive shaft 5 extends in an up-down direction in the upper casing 6. An engine E is mounted on the upper casing 6. The engine E is covered with a cowling 7.

The outboard motor 1 is attached to a stern T of a vessel B via a suspension device 8. As shown in FIG. 1, the suspension device 8 includes a clamp bracket 10 detachably fixed to the stern T, a swivel bracket 12 connected to the clamp bracket 10 so as to be rotatable about a tilt shaft 11 defining and serving as a horizontal rotating shaft, and a tilting cylinder device 13 disposed between the clamp bracket 10 and the swivel bracket 12. The supply and discharge of hydraulic oil to and from the tilting cylinder device 13 are controlled, and thus the swivel bracket 12 is rotated with respect to the clamp bracket 10. As a result, the mounting angle of the outboard motor 1 attached to the swivel bracket 12 is changed.

FIG. 1 shows a state in which the outboard motor 1 has been attached to the vessel B. In each preferred embodiments of the present invention, the right side in FIG. 1 is defined as the front side, the left side in FIG. 1 is defined as the rear side, the upper side in FIG. 1 is defined as the upper side, and the lower side in FIG. 1 is defined as the lower side.

In the outboard motor 1, a rotational force of the engine E is transmitted to the shift mechanism 3 in the lower casing 2 through the drive shaft 5 in the upper casing 6. The driving force transmitted to the shift mechanism 3 is transmitted to the blade pb through the propeller shaft 4. The rotational direction of the propeller shaft 4, i.e., the rotational direction of the blade pb is switched by the shift mechanism 3.

The shift mechanism 3 includes a drive gear 3a fixed to a lower end of the drive shaft 5 and a forward gear 3b and a backward gear 3c both of which are attached to the propeller shaft 4. The shift mechanism 3 additionally includes a dog clutch 3d disposed between the forward gear 3b and the backward gear 3c. Each of the drive gear 3a, the forward gear 3b, and the backward gear 3c is a bevel gear, for example.

The dog clutch 3d is spline-coupled with the propeller shaft 4. In other words, the dog clutch 3d is connected to the propeller shaft 4 in a state in which the dog clutch 3d is slidable in the axial direction of the propeller shaft 4 with respect to the propeller shaft 4, and is not relatively rotatable in the circumferential direction of the propeller shaft 4.

The dog clutch 3d moves on the propeller shaft 4 in the front-rear direction in response to the rotational driving of a shift rod 15 that is parallel or substantially parallel to the drive shaft 5 and that extends in the up-down direction. As a result, the dog clutch 3d is disposed in any of a forward position in which the dog clutch 3d engages the forward gear 3b, a backward position in which the dog clutch 3d engages the backward gear 3c, and a neutral position in which the dog clutch 3d engages neither the forward gear 3b nor the backward gear 3c.

When the dog clutch 3d is in the forwardposition, the rotation of the forward gear 3b is transmitted to the propeller shaft 4 through the dog clutch 3d. In response to the rotation of the propeller shaft 4, the blade pb rotates in a direction in which the vessel B is propelled forwardly. On the other hand, when the dog clutch 3d is in the backward position, the rotation of the backward gear 3c is transmitted to the propeller shaft 4 through the dog clutch 3d. The backward gear 3c rotates in a direction opposite to that of the forward gear 3b, and thus the propeller shaft 4 rotates in the opposite direction. Therefore, the blade pb rotates in the opposite direction, i.e., rotates in a direction in which the vessel B is propelled backwardly. On the other hand, when the dog clutch 3d is in the neutral position, the dog clutch 3d engages neither the forward gear 3b nor the backward gear 3c, and thus the rotational driving force of the drive shaft 5 is not transmitted to the propeller shaft 4. Therefore, the blade pb does not rotate in any direction.

Figure 2:
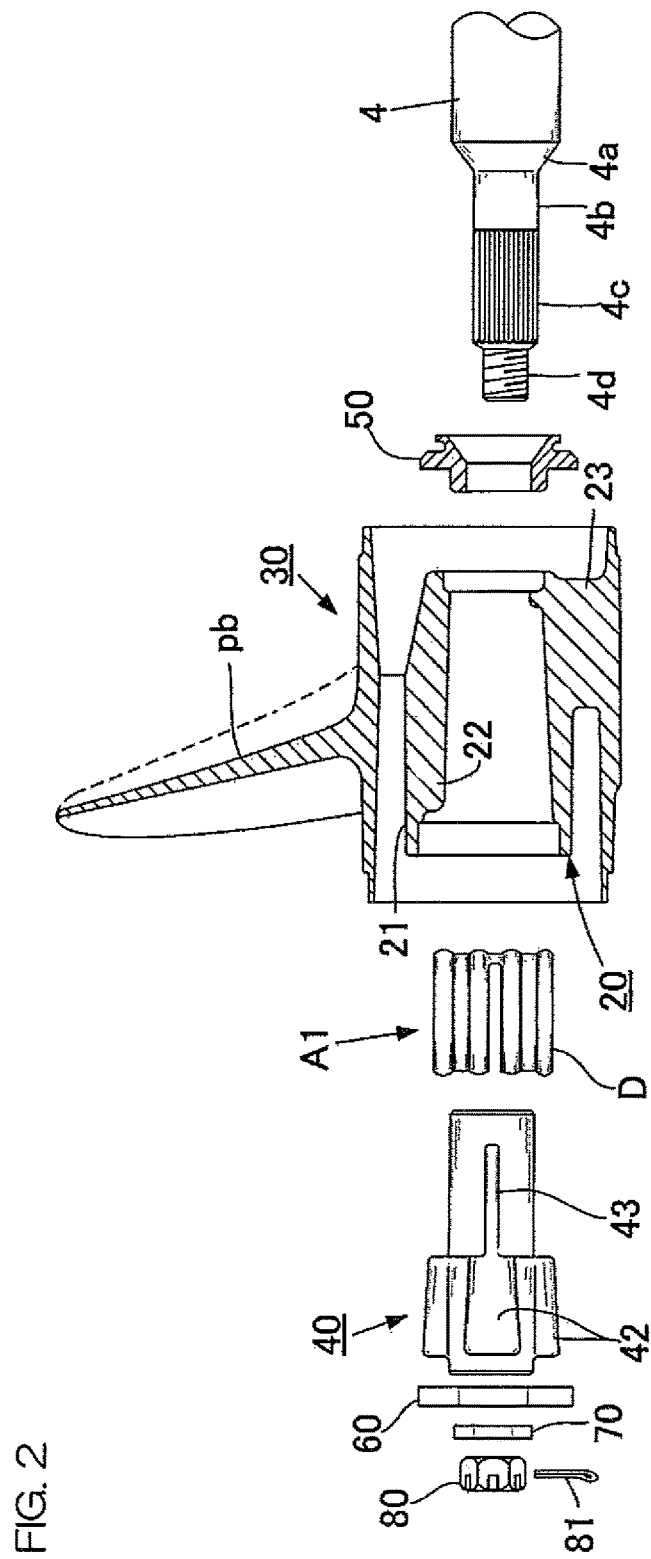
FIG. 2 is an exploded view of a propeller unit and the propeller shaft, in which the propeller unit and the propeller shaft are shown partially in cross-section.

FIG. 2 shows a state in which the propeller shaft 4 and the propeller unit PU have been disassembled. A rear end portion of the propeller shaft 4 includes a taper portion 4a that is tapered rearwardly, a cylindrical portion 4b that extends rearwardly from the taper portion 4a, a spline shaft portion 4c that extends rearwardly from the cylindrical portion 4b, and a male screw portion 4d that extends rearwardly from the spline shaft portion 4c.

Figure 3:
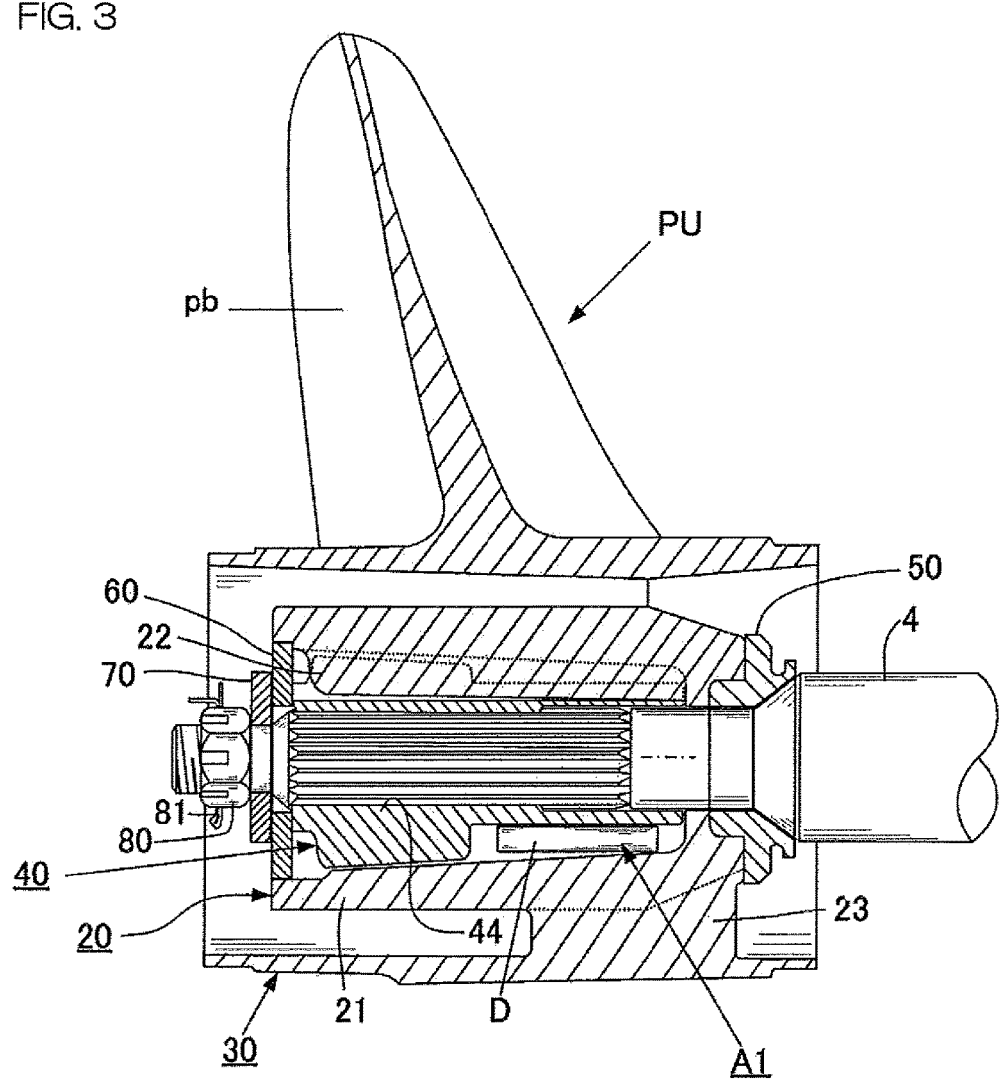
FIG. 3 is a partial cross-sectional view showing a state in which the propeller shaft has been connected to the propeller unit.

As shown in FIG. 3, the propeller unit PU is attached to the rear end portion of the propeller shaft 4. The propeller unit PU includes an inner hub 20, an outer hub 30, a bushing 40, and a shock absorber A1. The shock absorber A1 includes a damper D. Each of the inner hub 20, the outer hub 30, and the bushing 40 is cylindrical or substantially cylindrical.

Figure 4:
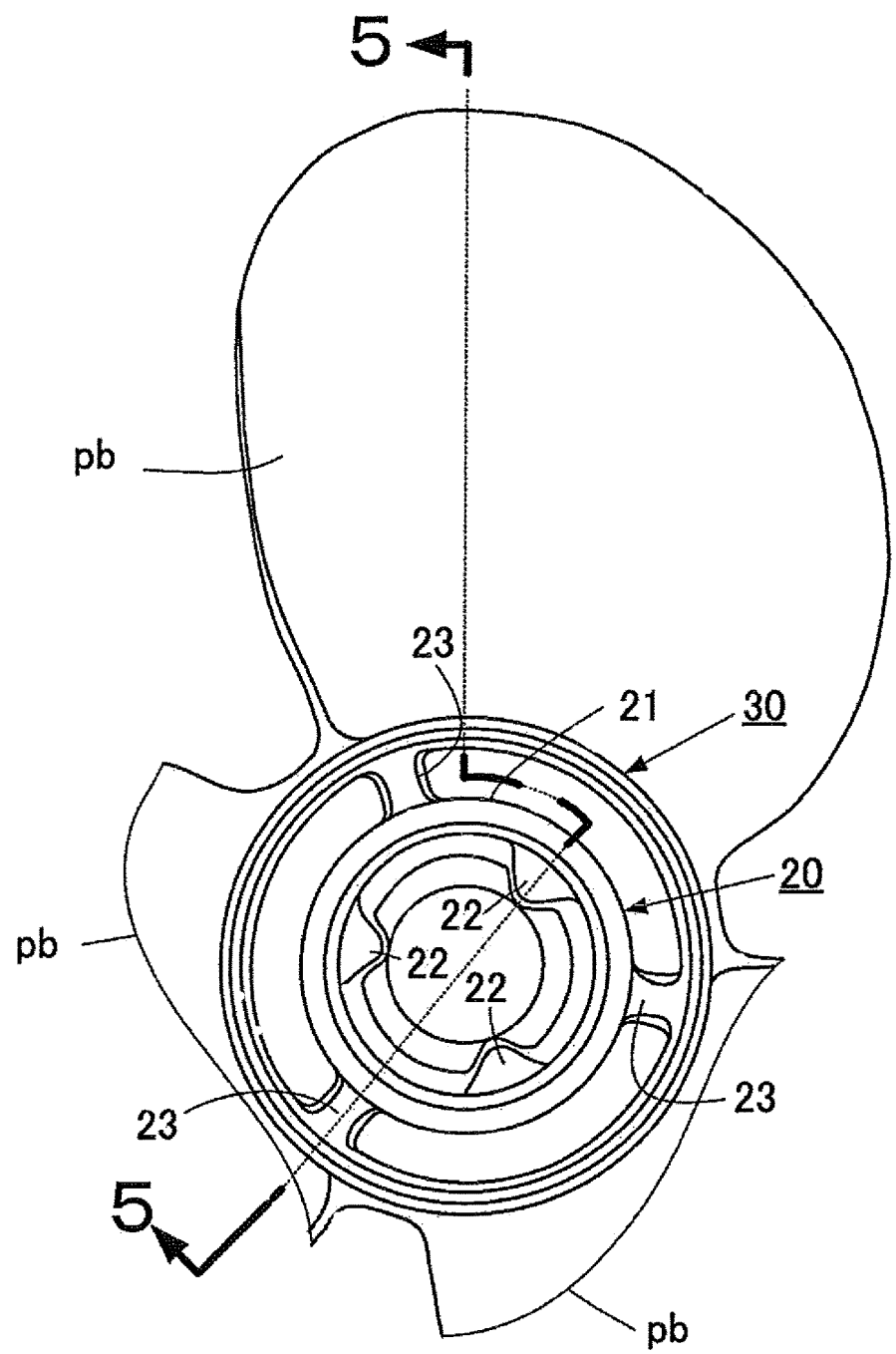
FIG. 4 is a rear view in which an outer hub and an inner hub provided in the propeller unit of FIG. 3 are seen from a rear end portion of the outer hub and from a rear end portion of the inner hub.

As shown particularly in FIG. 4 to FIG. 6, the inner hub 20 includes a cylindrical main body 21 and a plurality of (e.g., three) ribs 22 each of which protrudes inwardly in the radial direction from the cylindrical main body 21. The three ribs 22 are preferably equally spaced apart in the circumferential direction.

As shown in FIG. 3 and FIG. 4, the propeller unit PU includes preferably three connection pieces 23 each of which extends from the outer peripheral surface of the cylindrical main body 21 to the inner peripheral surface of the outer hub 30 in the radial direction. The inner hub 20, the connection pieces 23, and the outer hub 30 are preferably integral and unitary. The three connection pieces 23 are disposed between the inner hub 20 and the outer hub 30. The inner hub 20 is integrally connected to the outer hub 30 through the three connection pieces 23 in a state of being coaxially disposed inside the outer hub 30. Therefore, the inner hub 20 and the outer hub 30 rotate together with each other.

Figure 6A:
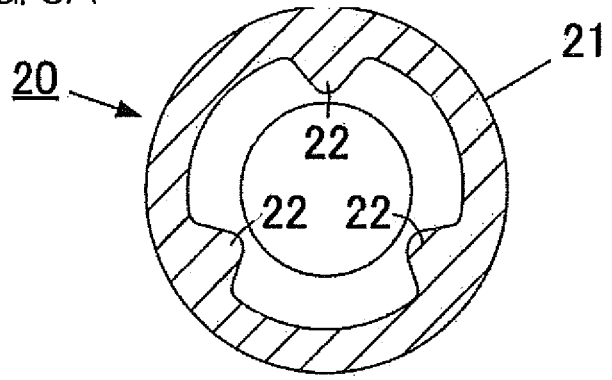
FIG. 6A is a cross-sectional view taken along line 6A-6A in FIG. 5.
Figure 6B:
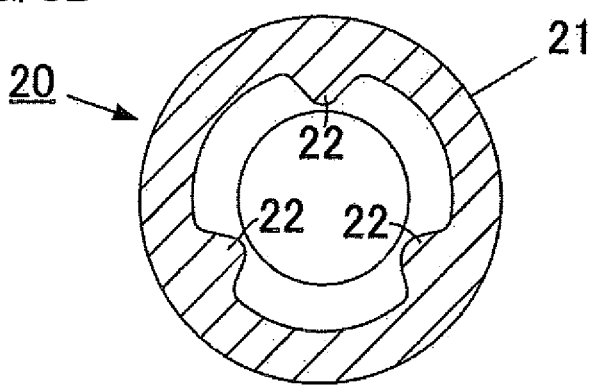
FIG. 6B is a cross-sectional view taken along line 6B-6B in FIG. 5.
Figure 6C:
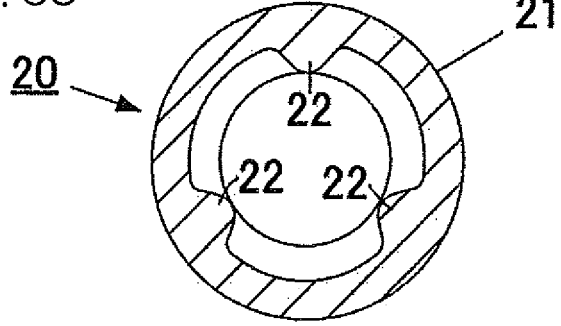
FIG. 6C is a cross-sectional view taken along line 6C-6C in FIG. 5.
Figure 7:
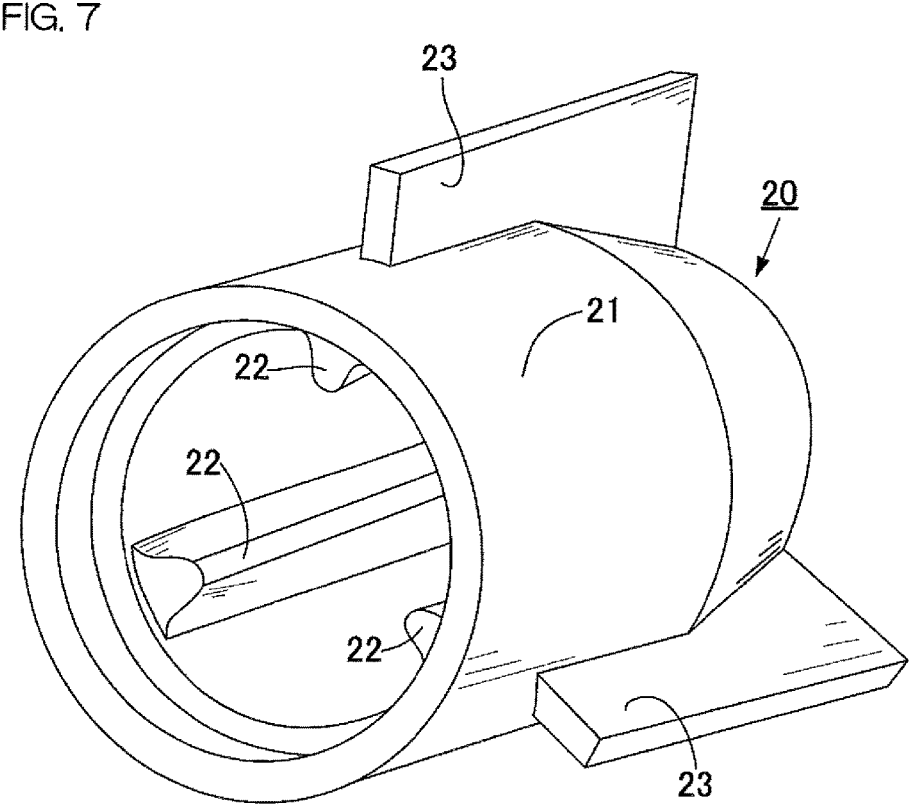
FIG. 7 is a perspective view of the inner hub.

Each rib 22 provided at the inner hub 20 extends straight in the axial direction. Additionally, as shown in FIG. 6A to FIG. 6C, each rib 22 has a shape in which the protruding amount of the rib 22 from the inner peripheral surface of the cylindrical main body 21 decreases and in which the width of the rib 22 in the circumferential direction increases as a distance in the axial direction from the rear end of the propeller unit PU toward the front end of the propeller unit PU increases.

The outer hub 30 is cylindrical or substantially cylindrical. As shown in FIG. 4, the outer hub 30 includes a cylindrical main body that surrounds the inner hub 20 and three blades pb integral with the cylindrical main body. The three blades pb are equally spaced apart in the circumferential direction. Each blade pb extends outwardly in the radial direction from the cylindrical main body.

Figure 8:
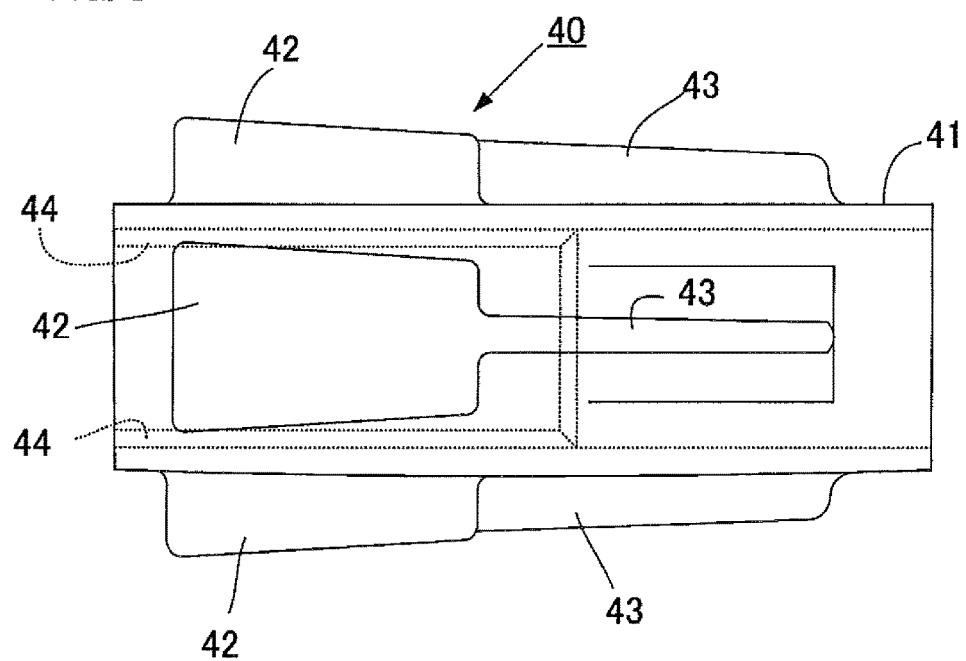
FIG. 8 is a side view of a bushing provided in the propeller unit.
Figure 9:
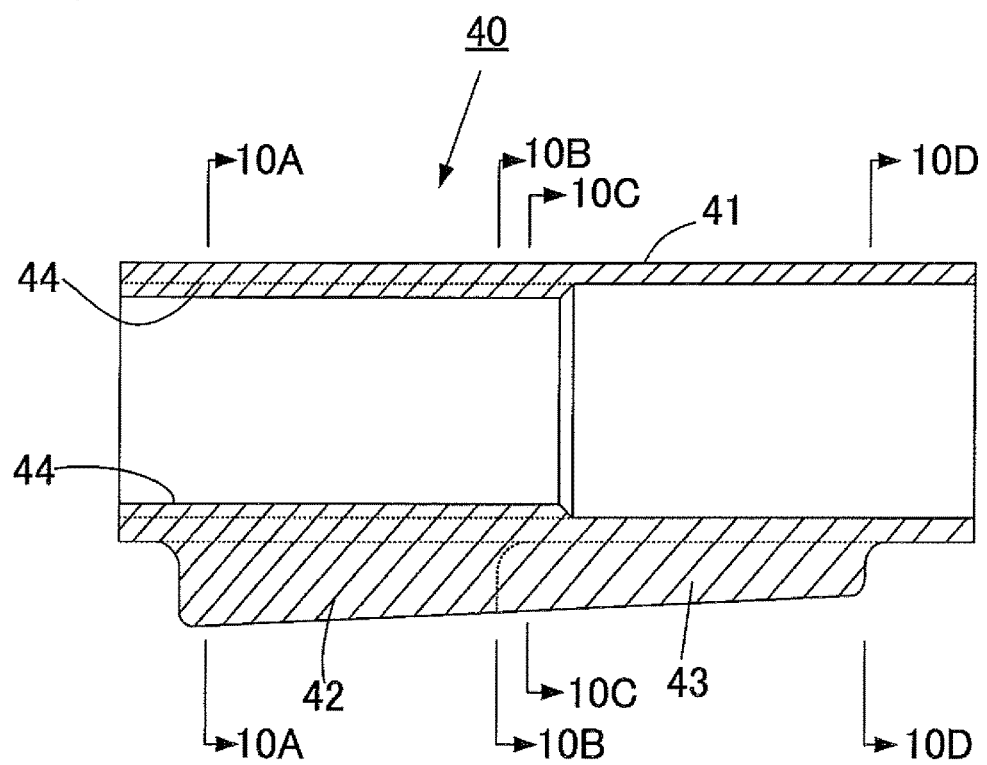
FIG. 9 is a longitudinal sectional view of the bushing.

As shown in FIG. 8 to FIG. 10, the bushing 40 includes a cylindrical bushing body 41, three rotation restricting projection portions 42 that protrude outwardly in the radial direction from the outer peripheral surface of the bushing body 41, and three ribs 43 that protrude outwardly in the radial direction from the outer peripheral surface of the bushing body 41.

The three rotation restricting projection portions 42 of the bushing 40 are disposed on the rear-end side in the outer peripheral surface of the bushing body 41. The three rotation restricting projection portions 42 are spaced apart in the circumferential direction. From the rear end of the rotation restricting projection toward the front end of the rotation restricting projection, each rotation restricting projection portion 42 is reduced in width in the circumferential direction and reduced in height from the outer peripheral surface of the bushing body 41.

The three ribs 43 of the bushing 40 are disposed on the front-end side in the outer peripheral surface of the bushing body 41. The three ribs 43 are spaced apart in the circumferential direction. The three ribs 43 correspond to the three rotation restricting projection portions 42, respectively. Therefore, the bushing 40 includes a plurality of pairs (three pairs) of rotation restricting projection portions 42 and ribs 43. The rotation restricting projection portion 42 and the rib 43 corresponding to each other are arranged in the axial direction. The width of the rotation restricting projection portion 42 in the circumferential direction is greater than the width of the rib 43 in the circumferential direction. Each rib 43 extends in the axial direction toward the front of the bushing 40 from the intermediate portion in the circumferential direction of the front end of the rotation restricting projection portion 42. Outer end surfaces of the pair of rotation restricting projection portions 42 and ribs 43 are continuous at a connection portion between the rotation restricting projection portion 42 and the rib 43, and heights of the outer end surfaces become lower as the outer end surfaces extend toward the rear end of the outer end surfaces. The outer end surface of the rotation restricting projection portion 42 denotes a surface occupying an outermost position in the radial direction in the rotation restricting projection portion 42. Likewise, the outer end surface of the rib 43 denotes a surface occupying an outermost position in the radial direction in the rib 43.

Figure 10A:
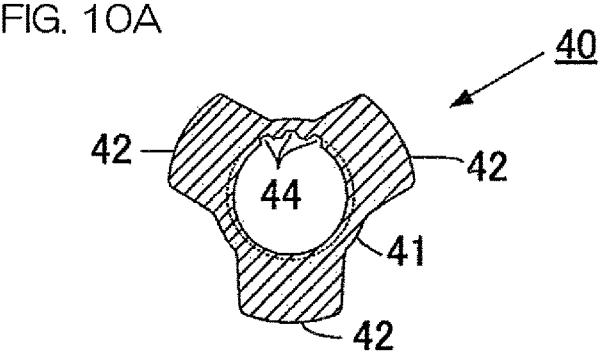
FIG. 10A is a cross-sectional view taken along line 10A-10A in FIG. 9.
Figure 10B:
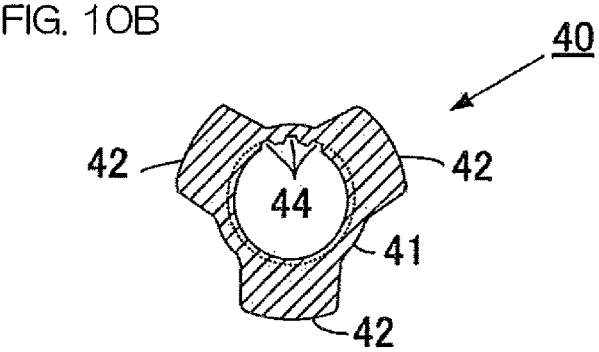
FIG. 10B is a cross-sectional view taken along line 10B-10B in FIG. 9.
Figure 10C:
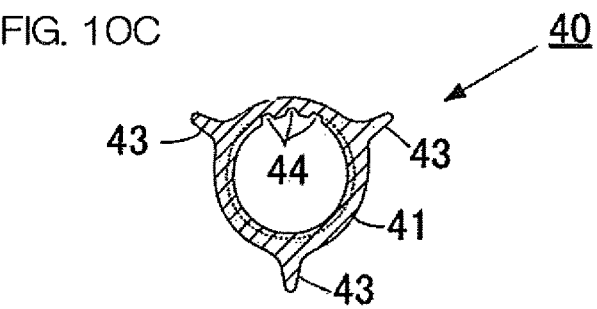
FIG. 10C is a cross-sectional view taken along line 10C-10C in FIG. 9.
Figure 10D:
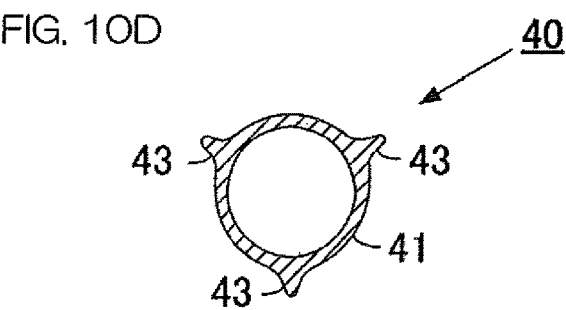
FIG. 10D is a cross-sectional view taken along line 10D-10D in FIG. 9.

As shown in FIG. 10C and FIG. 10D, each rib 43 of the bushing 40 includes a tapered cross-section that is reduced in width in the circumferential direction toward the outside in the radial direction. As a result, the volume of the bushing 40 is reduced. Therefore, the material cost and the weight of the bushing 40 is reduced. Additionally, each rib 43 has a tapered shape, and, as a result, an additional deformation-absorbing space is defined between the rib 43 and the damper D in a state in which the rib 43 of the bushing 40 is in contact with the damper D as described below. This additional deformation-absorbing space further improves shock absorbability.

As shown in FIG. 3, the bushing 40 is spline-coupled with the propeller shaft 4. In other words, as shown in FIG. 9, the bushing body 41 includes an involute spline portion 44 that is spline-coupled with the spline shaft portion 4c of the propeller shaft 4. The involute spline portion 44 is disposed at the inner peripheral portion of the bushing body 41. As shown in FIG. 10A, the involute spline portion 44 includes a plurality of spline teeth arranged in the circumferential direction. As shown in FIG. 3, the propeller shaft 4 is inserted into the bushing body 41 from in front of the bushing body 41 through a first spacer 50, and the spline shaft portion 4c of the propeller shaft 4 is spline-coupled with the involute spline portion 44. In this state, the propeller shaft 4 and the bushing 40 rotate together with each other in the circumferential direction.

A second spacer 60 and a washer 70 are disposed at the male screw portion 4d of the propeller shaft 4. A castle nut 80 screwed to the male screw portion 4d is disposed behind the washer 70. A locking pin 81 is attached to the castle nut 80.

Figure 13:
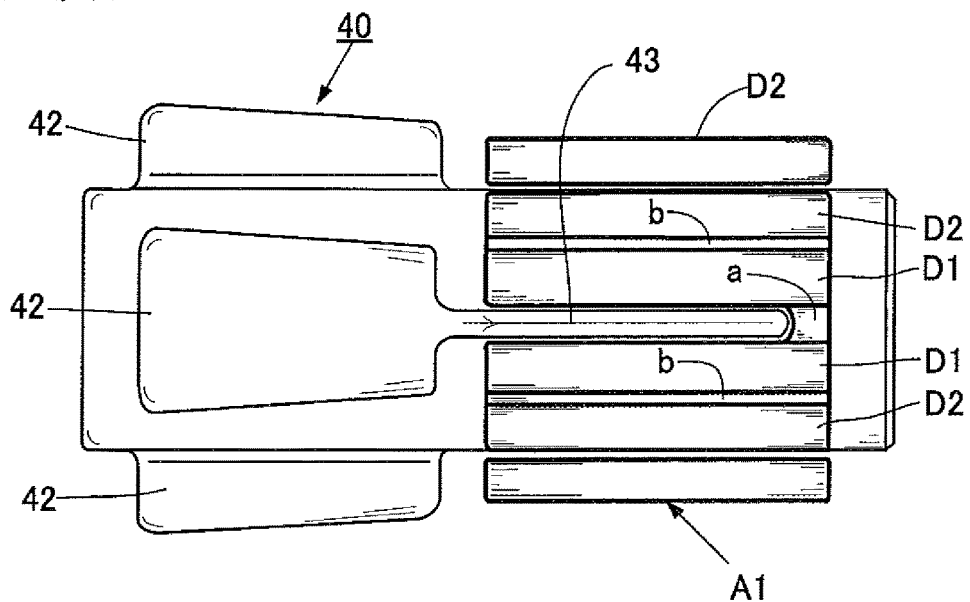
FIG. 13 is a side view showing a state in which the damper has been attached to the bushing.
Figure 14:
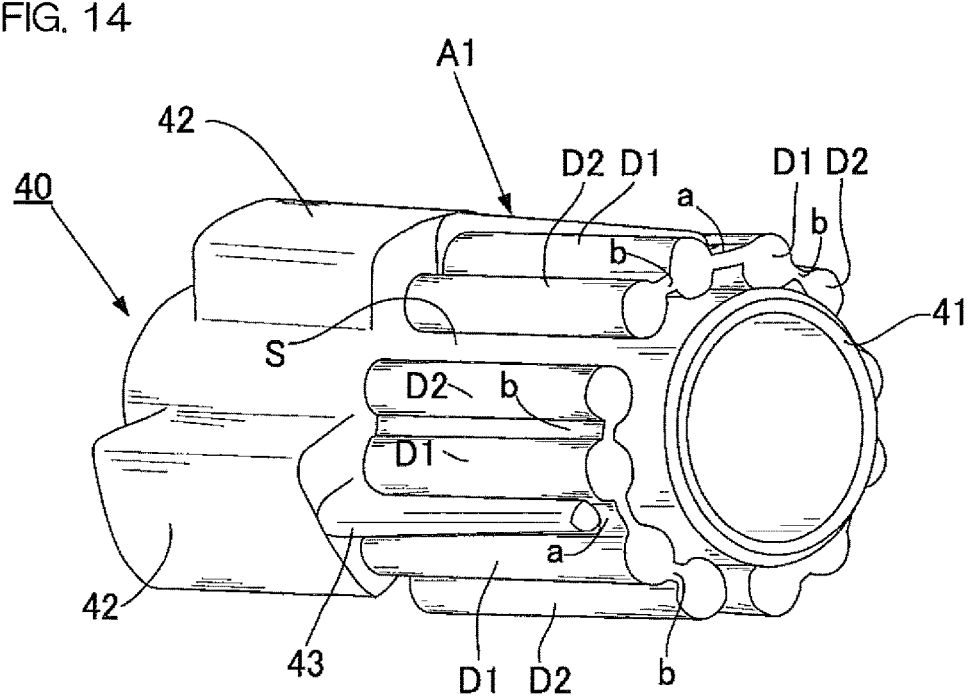
FIG. 14 is a perspective view of the damper attached to the bushing as seen from the front of the damper (from the propeller-shaft side).
Figure 15:
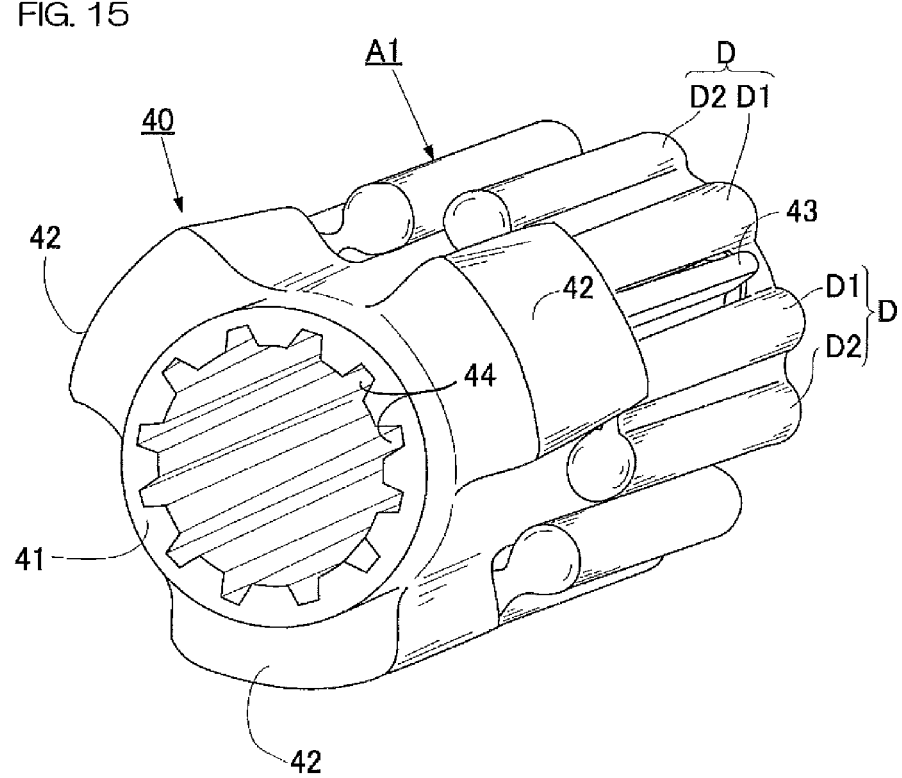
FIG. 15 is a perspective view of the damper attached to the bushing as seen from the rear of the damper.

The bushing 40 is coaxially fitted into the inner hub 20. As shown in FIG. 13 to FIG. 15, the shock absorber A1 is attached to the outer periphery of the front end portion of the bushing 40 before fitting the bushing 40 into the inner hub 20. Thereafter, the bushing 40, to which the shock absorber A1 has been attached, is inserted into the cylindrical main body 21 of the inner hub 20 from the rear end portion side of the inner hub 20.

The shock absorber A1 includes a plurality of (e.g., three) damper units DU that are disposed on the outer peripheral surface of the bushing 40 in a state of being spaced apart in the circumferential direction of the bushing 40. Each damper unit DU is preferably an integral and unitary member made of an elastic material such as natural rubber. Therefore, each damper unit DU is elastically deformable.

Figure 12:
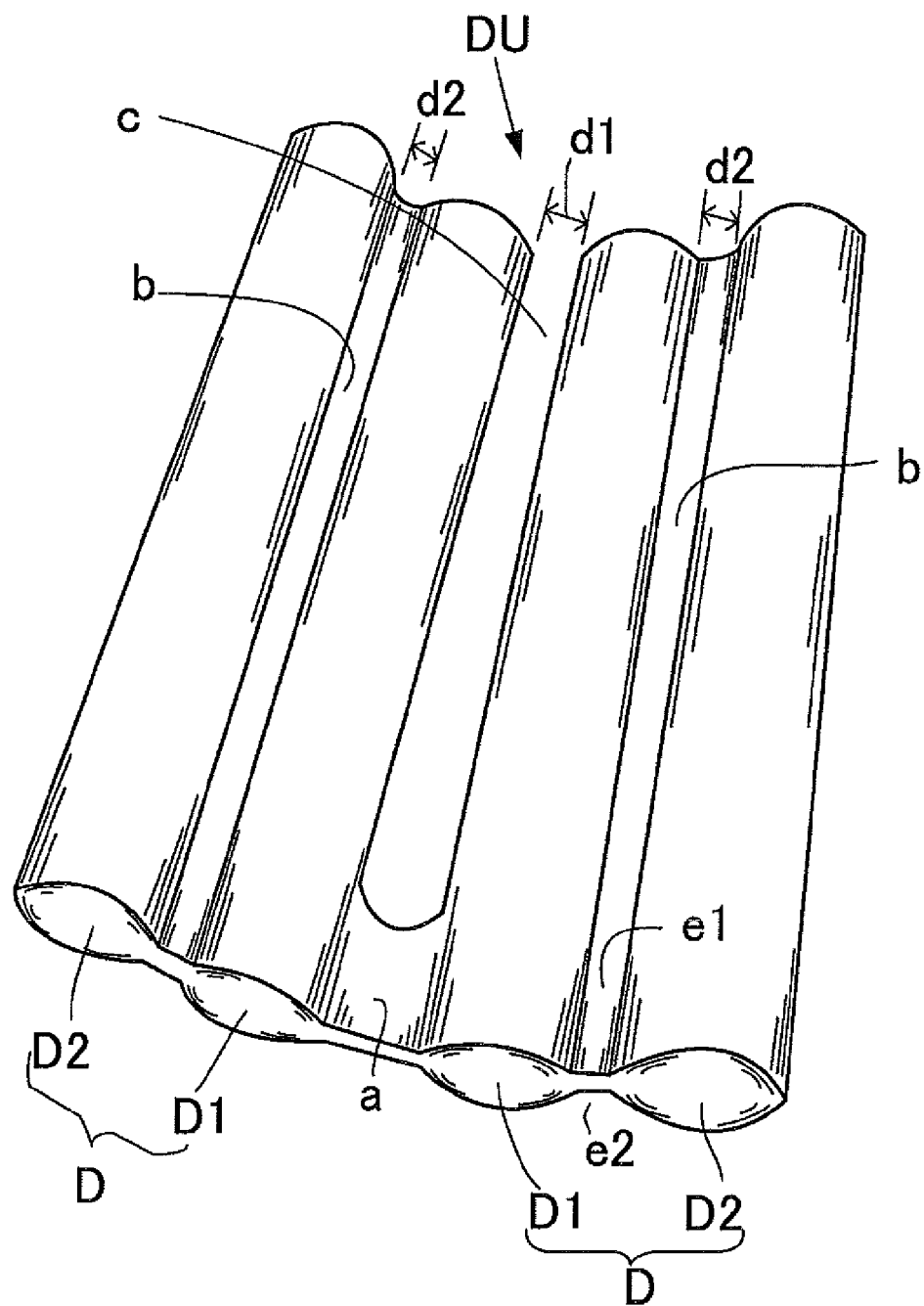
FIG. 12 is a perspective view of a damper according to a first preferred embodiment of the present invention.

As shown in FIG. 12, the damper unit DU includes a pair of dampers D and D that are disposed in parallel or substantially in parallel with each other with an interval d1 therebetween and a plate-shaped first connection arm a1 by which first end portions of the pair of dampers D and D in the axial direction of the bushing 40 are connected to each other. The interval d1 has a size allowing the rib 43 of the bushing 40 to be fitted therein.

As shown in FIG. 12, each damper D includes a cylindrical first elastic member D1, a cylindrical second elastic member D2, and a connection piece b by which the first elastic member D1 and the second elastic member D2 are connected to each other over the whole length of the first elastic member D1 and the second elastic member D2. The first elastic member D1 and the second elastic member D2 are disposed in parallel or substantially in parallel with each other with an interval d2 therebetween. The connection piece b is disposed between the first elastic member D1 and the second elastic member D2.

As shown in FIG. 12, the damper unit DU includes a first connection arm a1 by which end portions of the two first elastic members D1 are connected to each other so that the two first elastic members D1 (inner elastic members in FIG. 12) are disposed in parallel or substantially in parallel with each other with an interval d1 therebetween. The first connection arm a1 is disposed between the two first elastic members D1. The first connection arm a1 extends from the end portion of the first elastic member D1 (lower end portion in FIG. 12) in the axial direction of the first elastic member D1. The first connection arm a1 is shorter in the axial direction than the first elastic member D1. Therefore, the damper unit DU has a U-shape in a plan view that includes a non-connection portion c that extends from the first connection arm a1 in the axial direction between the two first elastic members D.

As shown in FIG. 13 to FIG. 15, the three damper units DU are disposed on the outer peripheral surface of the bushing 40. In more detail, each damper unit DU is disposed such that the rib 43 of the bushing 40 fits into a space defined by the non-connection portion c of the damper unit DU. The first elastic member D1 that is an inner one in each damper D is disposed along the rib 43 of the bushing 40, and the first connection arm "a" of the damper unit DU is disposed in a state of being close to or being in contact with the apex portion of the rib 43. As shown in FIG. 14, the three damper units DU are spaced apart in the circumferential direction. Therefore, the two second elastic members D2 respectively provided at the two damper units DU adjacent to each other in the circumferential direction are disposed such that a space S is defined between the two second elastic members D2. As described below, the rib 22 of the inner hub 20 is fitted into this space S.

The two dampers D and D of each damper unit DU are connected to each other by the first connection arm a1. Therefore, the damper unit DU is handled more easily, and is attached to the bushing 40 more easily than in an example in which the first connection arm a1 is not provided.

Figure 16:
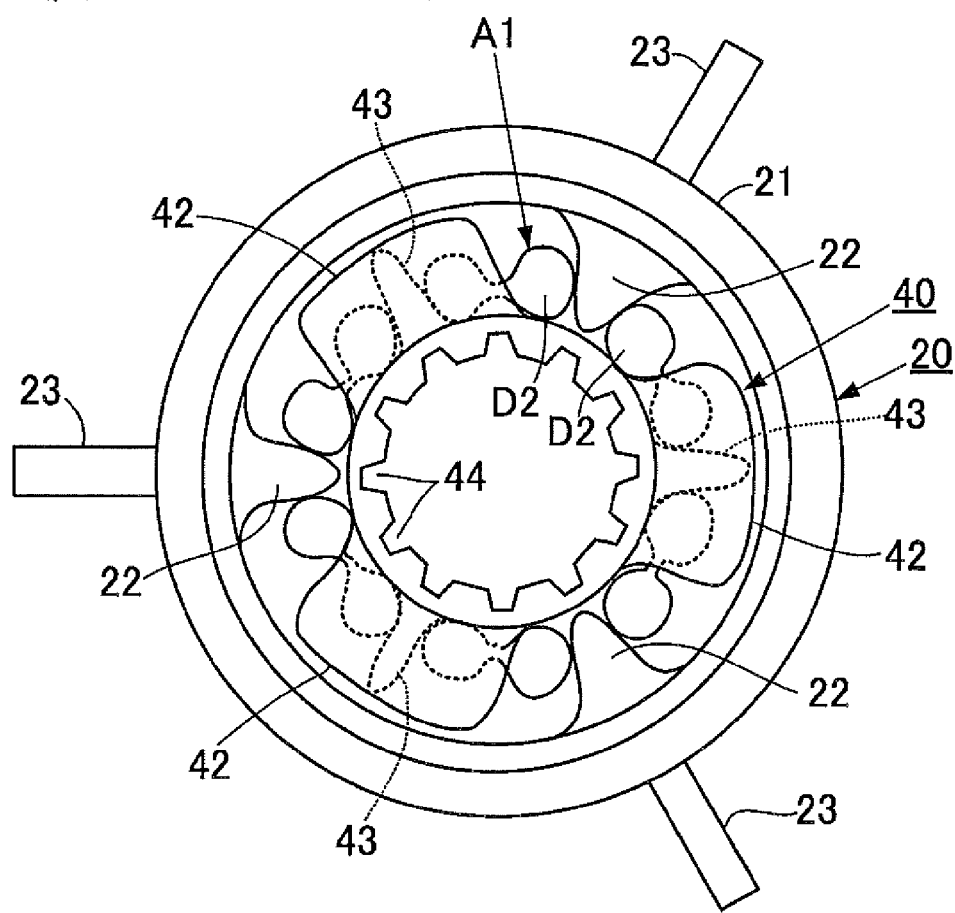
FIG. 16 is a rear view of the inner hub, to which the damper and the bushing have been attached, as seen from the rear of the inner hub.

As described above, the bushing 40 is fitted to the inner side of the inner hub 20 in a state in which the three damper units DU have been mounted on the outer peripheral surface of the bushing 40. This fitted state is shown in FIG. 16. As is understood from a combination of FIG. 14 and FIG. 16, each rib 22 of the inner hub 20 is disposed in the space S between the two damper units DU adjacent to each other in the circumferential direction.

Figure 17:
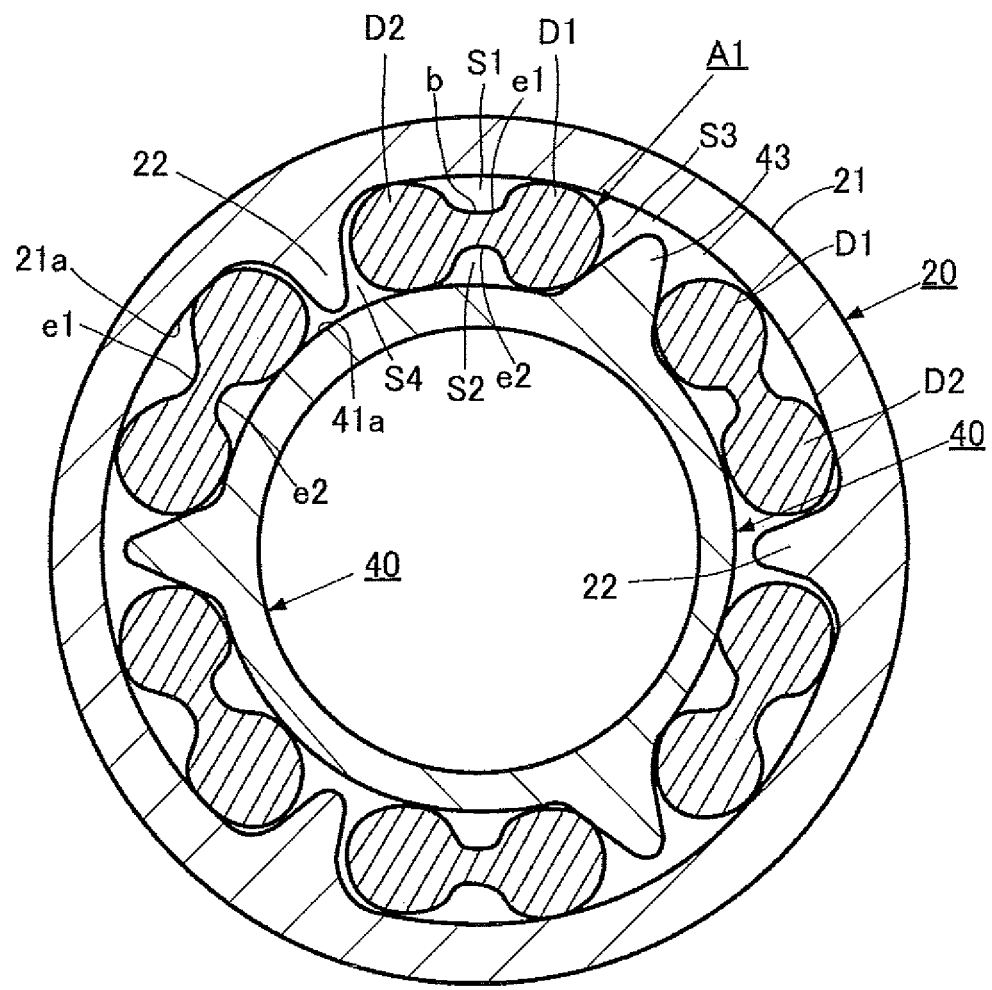
FIG. 17 is a cross-sectional view of the damper, the bushing, and the inner hub, which is perpendicular or substantially perpendicular to the axial direction of the bushing.

In more detail, as shown in FIG. 16 and FIG. 17, each damper D is disposed in a space surrounded by an outer peripheral surface 41a of the bushing body 41 of the bushing 40, by an inner peripheral surface 21a of the cylindrical main body 21 of the inner hub 20, by the rib 43 of the bushing 40, and by the rib 22 of the inner hub 20.

In this state, a portion facing the rib 43 of the bushing 40 in each damper D in the circumferential direction defines a "first portion D1" according to the first preferred embodiment of the present invention. The first portion D1 is a portion that comes into contact with the rib 43 of the bushing 40 in a state in which a rotational force has been applied to at least one of the bushing 40 and the inner hub 20. Additionally, a portion facing the rib 22 of the inner hub 20 in each damper D in the circumferential direction defines a "second portion D2" according to the first preferred embodiment of the present invention. The second portion D2 is a portion that comes into contact with the rib 22 of the inner hub 20 in a state in which a rotational force has been applied to at least one of the bushing 40 and the inner hub 20.

FIG. 17 shows a state in which a rotational force has not been applied between the bushing 40 and the inner hub 20. In other words, FIG. 17 shows a state in which a rotational force of the propeller shaft 4 has not been transmitted to the bushing 40. The damper D has a cross-sectional shape that defines deformation-absorbing spaces S1 and S2 between the first portion D1 and the second portion D2 in a state in which a rotational force by which the bushing 40 and the inner hub 20 are relatively rotated has not been applied to both of the bushing 40 and the inner hub 20, i.e., in a state in which the damper D has not been elastically deformed by relative rotation between the bushing 40 and the inner hub 20.

More specifically, as shown in FIG. 17, each of the first portion D1 and the second portion D2 has a cross-sectional shape that is circular or substantially circular. The connection piece b connects the first portion D1 and the second portion D2 to each other at an intermediate portion in the thickness direction (i.e., in the radial direction) of the first portion D1 and the second portion D2. The thickness of the connection piece b is smaller than the diameter of the first portion D1 and that of the second portion D2. Therefore, each damper D includes a pair of concave portions e1 and e2 that are concave shaped in the thickness direction of the damper D. The connection piece b is disposed between the pair of concave portions e1 and e2 in the thickness direction. The pair of concave portions e1 and e2 are disposed between the first portion D1 and the second portion D2 in the circumferential direction. As shown in FIG. 12, each of the concave portions e1 and e2 extends from one end of the damper D to the other end of the damper D in the axial direction.

As shown in FIG. 17, each damper D has an outer deformation-absorbing space S1 and an inner deformation-absorbing space S2 that are positioned between the first portion D1 and the second portion D2 and that are defined by the concave portions e1 and e2.

Next, a description will be given of a case in which a rotational force is applied to the bushing 40 and the inner hub 20 being in a state in which a rotational force has not been applied.

When a rotational force is applied between the bushing 40 and the inner hub 20, the rib 43 of the bushing 40 and the rib 22 of the inner hub 20 move relative to each other in the circumferential direction. As shown in FIG. 17, each rib 43 of the bushing 40 is disposed between the two ribs 22 of the inner hub 20 in the circumferential direction. Therefore, when the rib 43 of the bushing 40 and the rib 22 of the inner hub 20 move relative to each other in the circumferential direction, the rib 43 of the bushing 40 approaches one of the two ribs 22 of the inner hub 20 in the circumferential direction, and recedes from the other of the two ribs 22 of the inner hub 20 in the circumferential direction. The damper D disposed at a position from which both ribs 43 and 22 recede is never compressed. On the other hand, the damper D disposed at a position that is approached by both ribs 43 and 22 is compressed by both ribs 43 and 22 in the circumferential direction between the ribs 43 and 22 in response to a relative movement in the direction in which both ribs 43 and 22 approach each other.

The damper D is made of an elastic material such as rubber, and thus is elastically deformable. However, if a space surrounded by both ribs 43 and 22 is completely filled with the damper D, the damper D itself cannot be deformed even if the damper D itself is made of an elastic material such as rubber. Therefore, a shock buffering effect and an impact sound reducing effect can hardly be expected to be brought about by the damper D. Therefore, in the first preferred embodiment of the present invention, the damper D has a cross-sectional shape that defines a deformation-absorbing space so that the damper D itself becomes deformable in a state in which the damper D has been disposed between the bushing 40 and the inner hub 20.

Likewise, in a conventional damper, a slight space might be generated between a damper and a rib of a bushing and between a damper and a rib of an inner hub. However, the space generated in the conventional damper is not an intentional space but a resultant space caused by, for example, a difference in shape between the damper and the rib. Additionally, this slight space cannot satisfactorily absorb the deformation of the damper D. Therefore, in the first preferred embodiment of the present invention, a deformation-absorbing space having a sufficient size is positively secured in order to urge the damper D to be deformed.

As described above, when the rib 43 of the bushing 40 and the rib 22 of the inner hub 20 relatively move in the circumferential direction, the two ribs 43 and 22 approach each other in the circumferential direction. Therefore, the damper D is compressed by the two ribs 43 and 22 in the circumferential direction so that the first portion D1 approaches the second portion D2. As a result, the first deformation-absorbing space S1 and the second deformation-absorbing space S2 are both deformed. Additionally, the first deformation-absorbing space S1 and the second deformation-absorbing space S2 are secured, and thus the damper D is easily deformed. Therefore, a shock is effectively lessened, and an impact sound is effectively reduced at the shift-in time or the shift-out time of the dog clutch 3d.

Additionally, each of the rib 43 of the bushing 40 and the rib 22 of the inner hub 20 has a cross-sectional shape tapered toward the outer end of the rib 43 or the inner end of the rib 22. On the other hand, each of the first portion D1 and the second portion D2 of the damper D has a cross-sectional shape that is circular or substantially circular. Therefore, as shown in FIG. 17, in a state in which a rotational force has not been applied between the bushing 40 and the inner hub 20, an additional deformed space S3 resulting from a difference in the cross-sectional shape is provided between the first portion D1 of the damper and the rib 43 of the bushing 40. Likewise, an additional deformed space S4 resulting from a difference in the cross-sectional shape is provided between the rib 22 of the inner hub 20 and the second portion D2 of the damper D. These additional deformed spaces S3 and S4 further improve the shock lessening effect and the impact sound reducing effect.

Additionally, if the engine E is provided in a vessel propulsion apparatus, a rotational force to be transmitted from a crankshaft of the engine E to the drive shaft 5 will occasionally pulsate. A shock and a sound generated near the dog clutch resulting from this pulsation of the rotational force is also effectively reduced by the damper D defining and serving as a shock absorber A1 according to the first preferred embodiment of the present invention.

In the first preferred embodiment of the present invention, the outer deformation-absorbing space S1 and the inner deformation-absorbing space S2 preferably are arranged so as to be substantially symmetrical or symmetrical with respect to the connection piece b, and are substantially the same or the same in cross-sectional shape and cross-sectional area. However, the present invention is not limited to this, and the outer deformation-absorbing space S1 and the inner deformation-absorbing space S2 may be asymmetrical, or may differ from each other in the cross-sectional shape and/or in the cross-sectional area.

If the total of the cross-sectional areas of the outer and inner deformation-absorbing spaces S1 and S2 is too small, a shock lessening effect and an impact sound reducing effect brought about by the damper D will be lessened. In the first preferred embodiment of the present invention, the total of the cross-sectional areas of the outer and inner deformation-absorbing spaces S1 and S2 denotes the cross-sectional area of a deformation-absorbing space of the damper D. Additionally, in the first preferred embodiment of the present invention, the total of the cross-sectional areas of the first portion D1, the second portion D2, and the connection piece b denotes the cross-sectional area of the damper D. Preferably, the cross-sectional area of the deformation-absorbing space of the damper D is about 30% or more of the cross-sectional area of the damper D, for example. A more suitable range of the cross-sectional area of the deformation-absorbing space is about 40% or more of the cross-sectional area of the damper D, for example.

Contrary thereto, if the cross-sectional area of the deformation-absorbing space is too large, the shock lessening effect and the impact sound reducing effect will be lessened likewise. In the first preferred embodiment of the present invention, the total of the cross-sectional areas of the outer and inner deformation-absorbing spaces S1 and S2 denotes the cross-sectional area of the deformation-absorbing space of the damper D. In the first preferred embodiment of the present invention, the total of the cross-sectional areas of the first portion D1, the second portion D2, and the connection piece b denotes the cross-sectional area of the damper D. Preferably, the cross-sectional area of the deformation-absorbing space of the damper D is about 80% or less of the cross-sectional area of the damper D, for example. A more suitable range of the cross-sectional area of the deformation-absorbing space is about 60% or less of the cross-sectional area of the damper D, for example. In other words, preferably, the cross-sectional area of the deformation-absorbing space according to the first preferred embodiment of the present invention is set within the range of about 30% to about 80%, more preferably, about 40% to about 60% of the cross-sectional area of the damper D, for example.

In the first preferred embodiment of the present invention, the three rotation restricting projection portions 42 are provided at the rear end portion of the outer peripheral surface of the bushing 40 as shown in FIG. 13 to FIG. 15, for example, in order to prevent the damper D from receiving a great load and from being damaged, for example, at the shift-in time. These rotation restricting projection portions 42 are disposed such that the pair of rotation restricting projection portions 42 and the ribs 43 are arranged in the axial direction. Each rotation restricting projection portion 42 comes into contact with each rib 22 of the inner hub 20 before a great load that may cause the breakdown of the damper D is applied to the bushing 40. Therefore, the rotation restricting projection portions 42 restrict relative rotation between the bushing 40 and the inner hub 20 and prevent the breakdown of the damper D.

Second Preferred Embodiment

Figure 18:
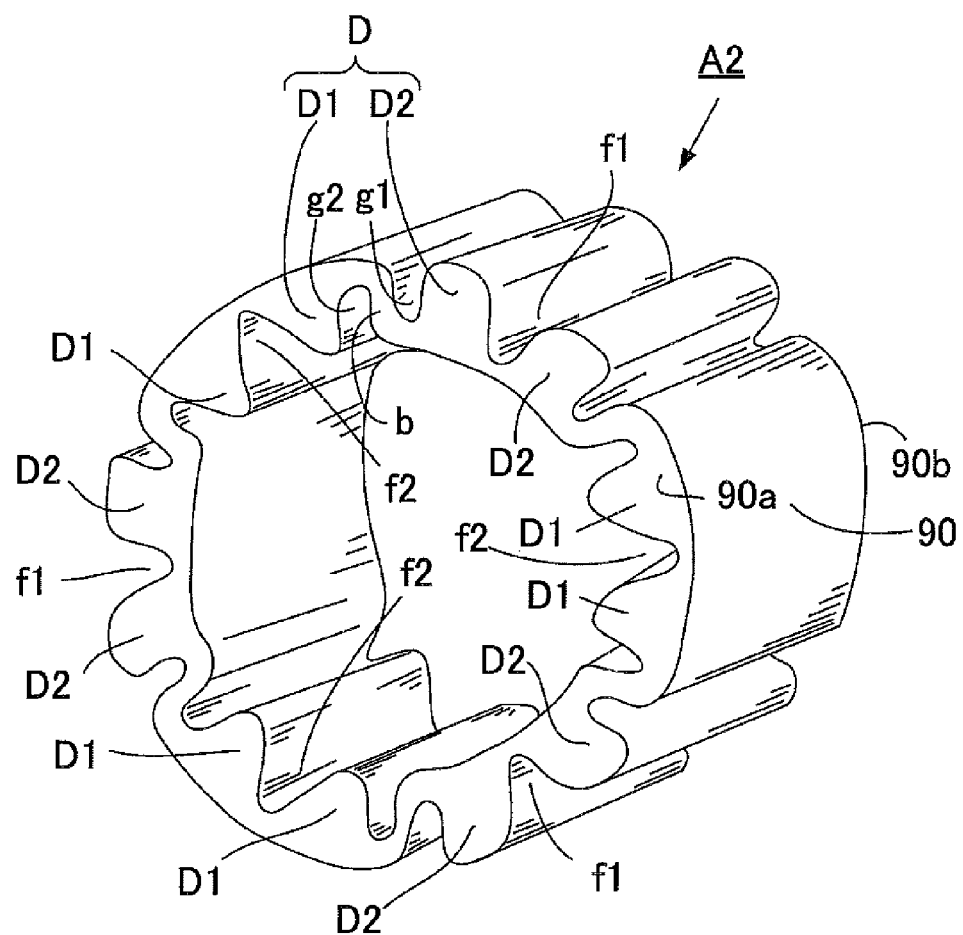
FIG. 18 is a perspective view of a damper according to a second preferred embodiment of the present invention.

FIG. 18 shows a shock absorber A2 according to a second preferred embodiment of the present invention. The shock absorber A2 is made of an elastic material, such as rubber, in the same manner as in the first preferred embodiment of the present invention. However, the shock absorber A2 is an integral and unitary cylindrical member 90 that differs from that of the first preferred embodiment of the present invention. The shock absorber A2 is continuous over its whole circumference in the circumferential direction of the shock absorber A2.

As shown in FIG. 18, the shock absorber A2 includes three outer concave portions f1, f1, and f1 corresponding to three ribs 22, 22, and 22 provided at the inner hub 20, respectively. Each outer concave portion f1 extends inwardly in the radial direction from the outer peripheral surface of the cylindrical member 90. The outer concave portions f1, f1, and f1 are preferably equally spaced apart in the circumferential direction, and extend in the axial direction of the cylindrical member 90 from a first end portion 90a of the cylindrical member 90 in the length direction of the cylindrical member 90 toward a second end portion 90b of the cylindrical member 90 in the length direction of the cylindrical member 90. The length direction of the cylindrical member 90 is a direction equivalent to the axial direction of the bushing 40.

The shock absorber A2 additionally includes three inner concave portions f2, f2, and f2 corresponding to three ribs 43, 43, and 43 provided on the bushing 40, respectively. Each inner concave portion f2 extends outwardly in the radial direction from the inner peripheral surface of the cylindrical member 90. The inner concave portions f2, f2, and f2 are preferably equally spaced apart in the circumferential direction, and extend in the axial direction of the cylindrical member 90 from the first end portion 90a of the cylindrical member 90 in the length direction of the cylindrical member 90 toward the second end portion 90b of the cylindrical member 90 in the length direction of the cylindrical member 90.

The shock absorber A2 additionally includes a first concave portion g1 extending inwardly in the radial direction from the outer peripheral surface of the cylindrical member 90 between the outer concave portion f1 and the inner concave portion f2 in the circumferential direction. The first concave portion g1 extends in the axial direction of the cylindrical member 90 from the first end portion 90a of the cylindrical member 90 toward the second end portion 90b of the cylindrical member 90. The first concave portion g1 defines a portion of a deformation-absorbing space according to the second preferred embodiment of the present invention.

The shock absorber A2 additionally includes a second concave portion g2 extending outwardly in the radial direction from the inner peripheral surface of the cylindrical member 90 between the outer concave portion f1 and the inner concave portion f2. The second concave portion g2 extends in the axial direction of the cylindrical member 90 from the first end portion 90a of the cylindrical member 90 toward the second end portion 90b of the cylindrical member 90. The second concave portion g2 also defines a portion of the deformation-absorbing space according to the second preferred embodiment of the present invention.

A portion positioned between the inner concave portion f2 and the second concave portion g2 is equivalent to a "first portion D1" according to the second preferred embodiment of the present invention. A portion positioned between the outer concave portion f1 and the first concave portion g1 is equivalent to a "second portion D2" according to the second preferred embodiment of the present invention. The first portion D1 and the second portion D2 are connected to each other by a connection piece b.

The damper D according to the second preferred embodiment of the present invention includes the first portion D1, the second portion D2, and the connection piece b by which the first portion D1 and the second portion D2 are connected to each other. The shock absorber A2 according to the second preferred embodiment of the present invention is an integral and unitary member in which, for example, six dampers D are integrally connected to each other in a state in which the six dampers D are arranged in the circumferential direction.

Figure 19:
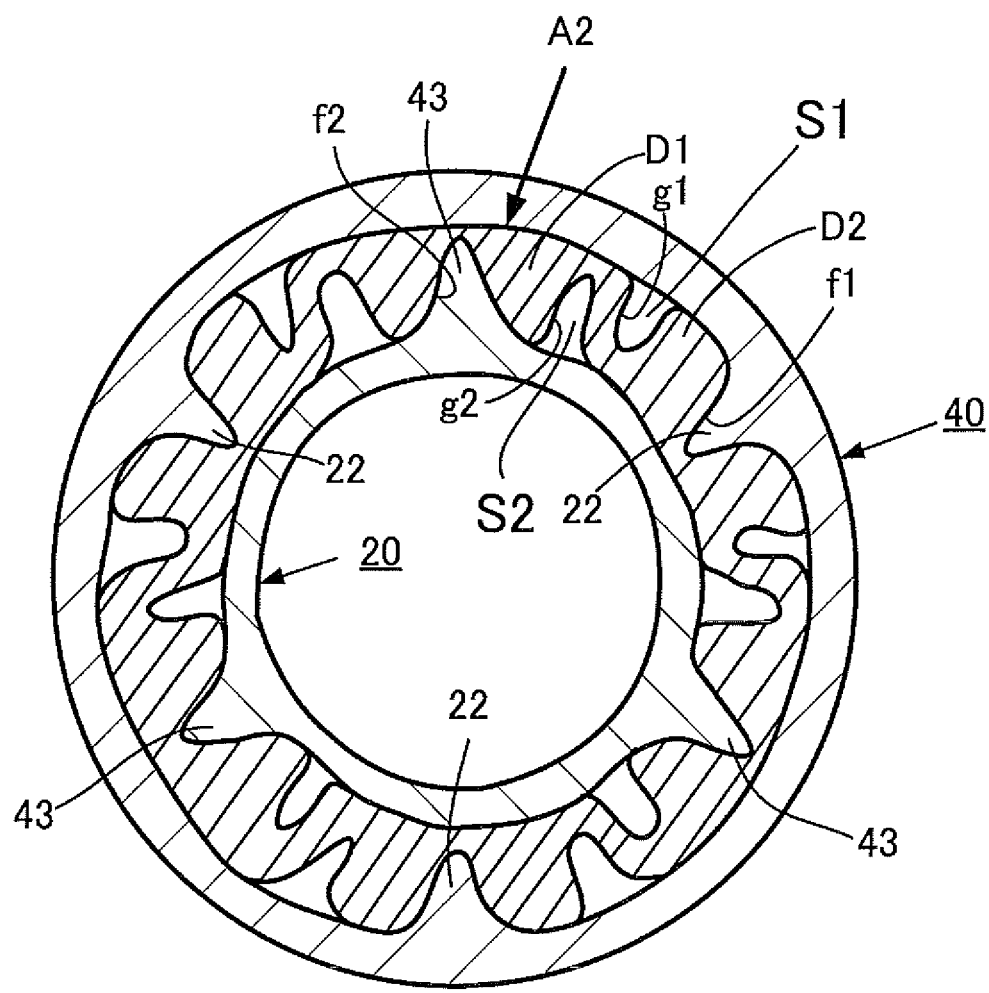
FIG. 19 is a cross-sectional view showing a state in which the damper according to the second preferred embodiment of the present invention has not yet been deformed.

The shock absorber A2 according to the second preferred embodiment of the present invention is interposed between the bushing 40 and the inner hub 20 in the same manner as in the first preferred embodiment of the present invention. In this state, the rib 43 of the bushing 40 is fitted to the inner concave portion f2, and the rib 22 of the inner hub 20 is fitted to the outer concave portion f1 as shown in FIG. 19. In this fitted state, deformation-absorbing spaces S1 and S2 are provided between the first portion D1 and the second portion D2 by the first concave portion g1 and the second concave portion g2, respectively.

Next, a description will be given of a case in which the bushing 40 and the inner hub 20 are in a state (state shown in FIG. 19) in which a rotational force has not been applied thereto.

Figure 20:
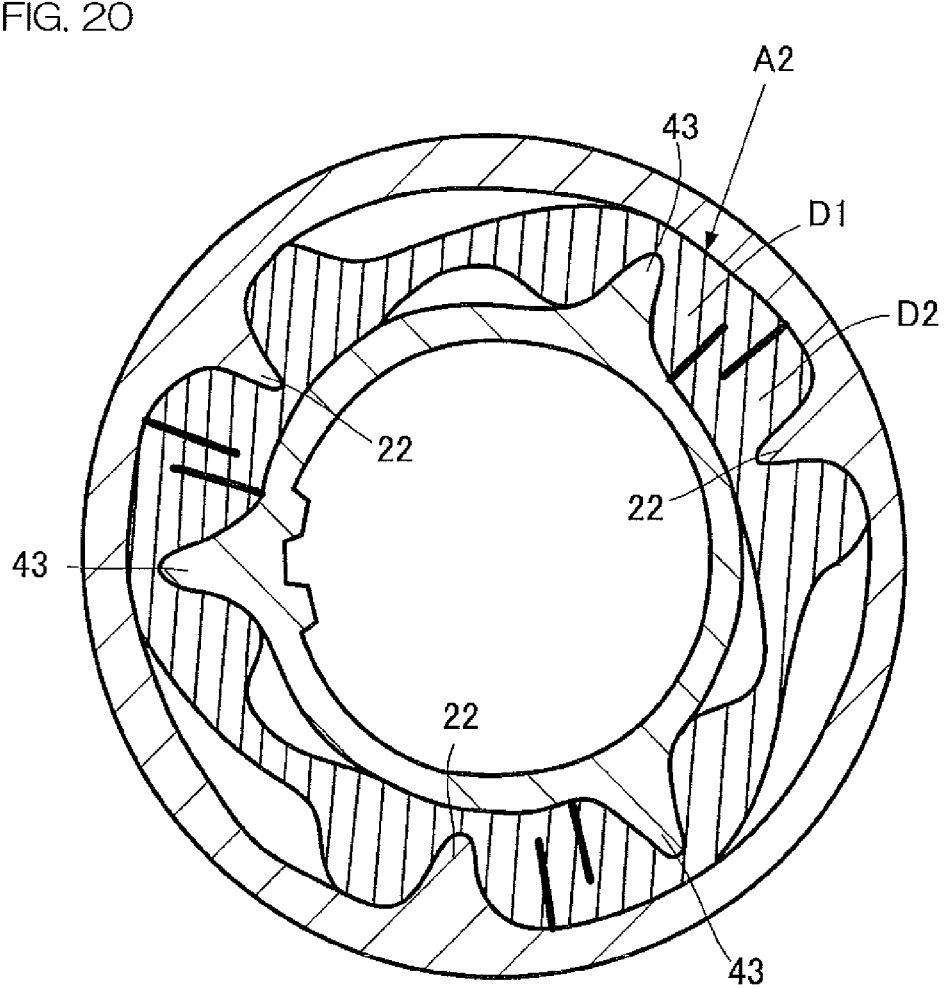
FIG. 20 is a cross-sectional view showing a state in which the damper according to the second preferred embodiment of the present invention has been deformed.

When a rotational force is applied between the bushing 40 and the inner hub 20, the rib 43 of the bushing 40 and the rib 22 of the inner hub 20 relatively move in the circumferential direction. As a result of this relative movement, the damper D is enlarged in the circumferential direction and is compressed in the circumferential direction as shown in FIG. 20. As is understood from a combination of FIG. 19 and FIG. 20, the deformation-absorbing spaces S1 and S2 defined by the first and second concave portions g1 and g2 are deformed by the compression of the damper D.

The deformation-absorbing spaces S1 and S2 are enlarged or compressed in this manner, and, as a result, a shock and a sound is effectively reduced at the shift-in time or the shift-out time of the dog clutch 3d. The generation of a noise that is occasionally made from the dog clutch when an engine is provided in a vessel propulsion apparatus is also effectively reduced by the shock absorber A2.

Third Preferred Embodiment

Figure 21:
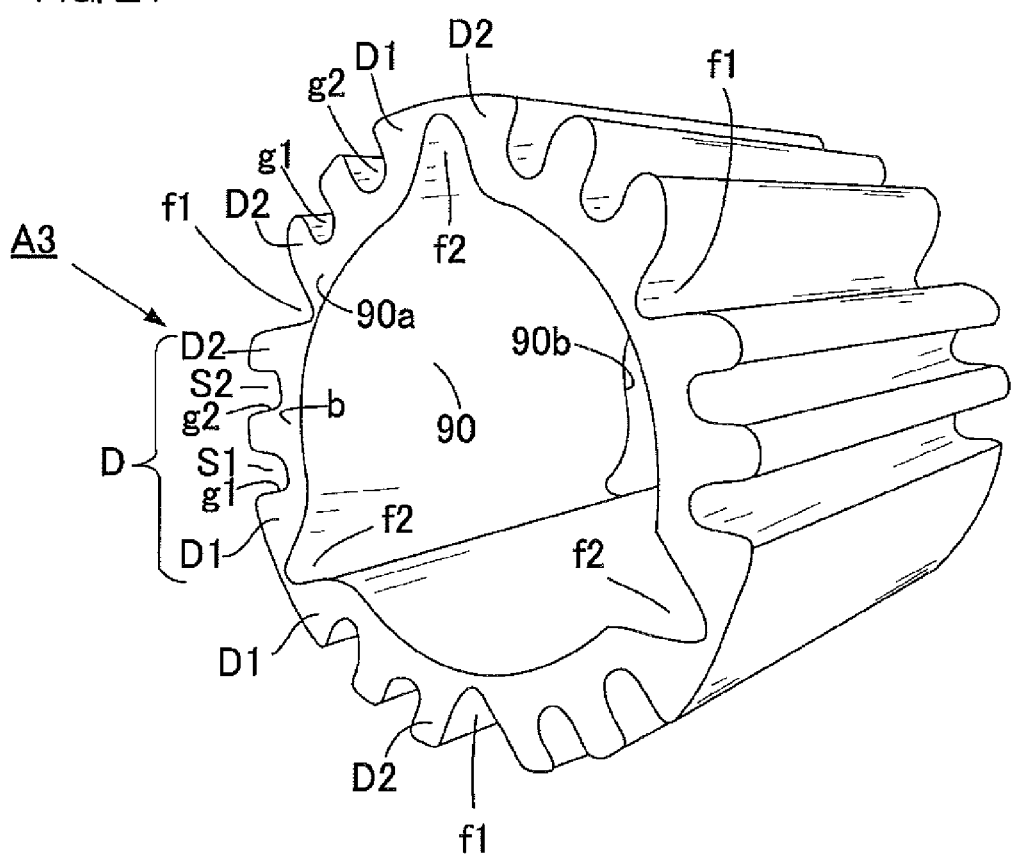
FIG. 21 is a perspective view of a damper according to a third preferred embodiment of the present invention.

FIG. 21 shows a shock absorber A3 according to a third preferred embodiment of the present invention. The shock absorber A3 is made of an elastic material, such as rubber, in the same manner as in the first and second preferred embodiments of the present invention. Additionally, the shock absorber A3 is an integral and unitary cylindrical member 90 in the same manner as in the second preferred embodiment of the present invention.

As shown in FIG. 21, the shock absorber A3 includes three outer concave portions f1, f1, and f1 corresponding to three ribs 22, 22, and 22 provided at the inner hub 20, respectively. Each outer concave portion f1 extends inwardly in the radial direction from the outer peripheral surface of the cylindrical member 90. The outer concave portions f1 are preferably equally spaced apart in the circumferential direction, and extend in the axial direction of the cylindrical member 90 from a first end portion 90a of the cylindrical member 90 toward a second end portion 90b of the cylindrical member 90.

The shock absorber A3 additionally includes three inner concave portions f2, f2, and f2 corresponding to three ribs 43, 43, and 43 provided at the bushing 40, respectively. Each inner concave portion f2 extends outwardly in the radial direction from the inner peripheral surface of the cylindrical member 90. The inner concave portions f2 are preferably equally spaced apart in the circumferential direction, and extend in the axial direction of the cylindrical member 90 from the first end portion 90a of the cylindrical member 90 toward the second end portion 90b of the cylindrical member 90.

The shock absorber A3 additionally includes a first concave portion g1 and a second concave portion g2 disposed between the outer concave portion f1 and the inner concave portion f2 in the circumferential direction. The first concave portion g1 and the second concave portion g2 are disposed with an interval therebetween in the circumferential direction. Each of the first and second concave portions g1 and g2 is concave shaped radially inward from the outer peripheral surface of the cylindrical member 90. Each of the first and second concave portions g1 and g2 extends in the axial direction of the cylindrical member 90 from the first end portion 90a of the cylindrical member 90 toward the second end portion 90b of the cylindrical member 90. Each of the first and second concave portions g1 and g2 defines a deformation-absorbing space according to the third preferred embodiment of the present invention.

A portion positioned between the inner concave portion f2 and the first concave portion g1 is equivalent to a "first portion D1" according to the third preferred embodiment of the present invention. A portion positioned between the outer concave portion f1 and the second concave portion g2 is equivalent to a "second portion D2" according to the third preferred embodiment of the present invention. The first portion D1 and the second portion D2 are connected to each other by a connection piece b.

The damper D according to the third preferred embodiment of the present invention includes the first portion D1, the second portion D2, and the connection piece b by which the first portion D1 and the second portion D2 are connected to each other. The shock absorber A3 is preferably an integral and unitary member in which six dampers D are integrally connected to each other in a state in which the six dampers D are arranged in the circumferential direction.

The shock absorber A3 according to the third preferred embodiment of the present invention is interposed between the bushing 40 and the inner hub 20 in the same manner as in the first and second preferred embodiments of the present invention. In this state, the rib 43 of the bushing 40 is fitted to the inner concave portion f2, and the rib 22 of the inner hub 20 is fitted to the outer concave portion f1. In this fitted state, deformation-absorbing spaces S1 and S2 are provided between the first portion D1 and the second portion D2 by the first concave portion g1 and the second concave portion g2, respectively.

When a rotational force is applied between the bushing 40 and the inner hub 20, the deformation-absorbing spaces S1 and S2 are enlarged or compressed in the same manner as in the second preferred embodiment of the present invention. As a result, a shock and a sound are effectively reduced at the shift-in time or the shift-out time of the dog clutch 3d. The noises or vibrations that are occasionally generated by the dog clutch when an engine is used as a vessel propulsion apparatus is also effectively reduced by the shock absorber A3.

Fourth Preferred Embodiment

Figure 22:
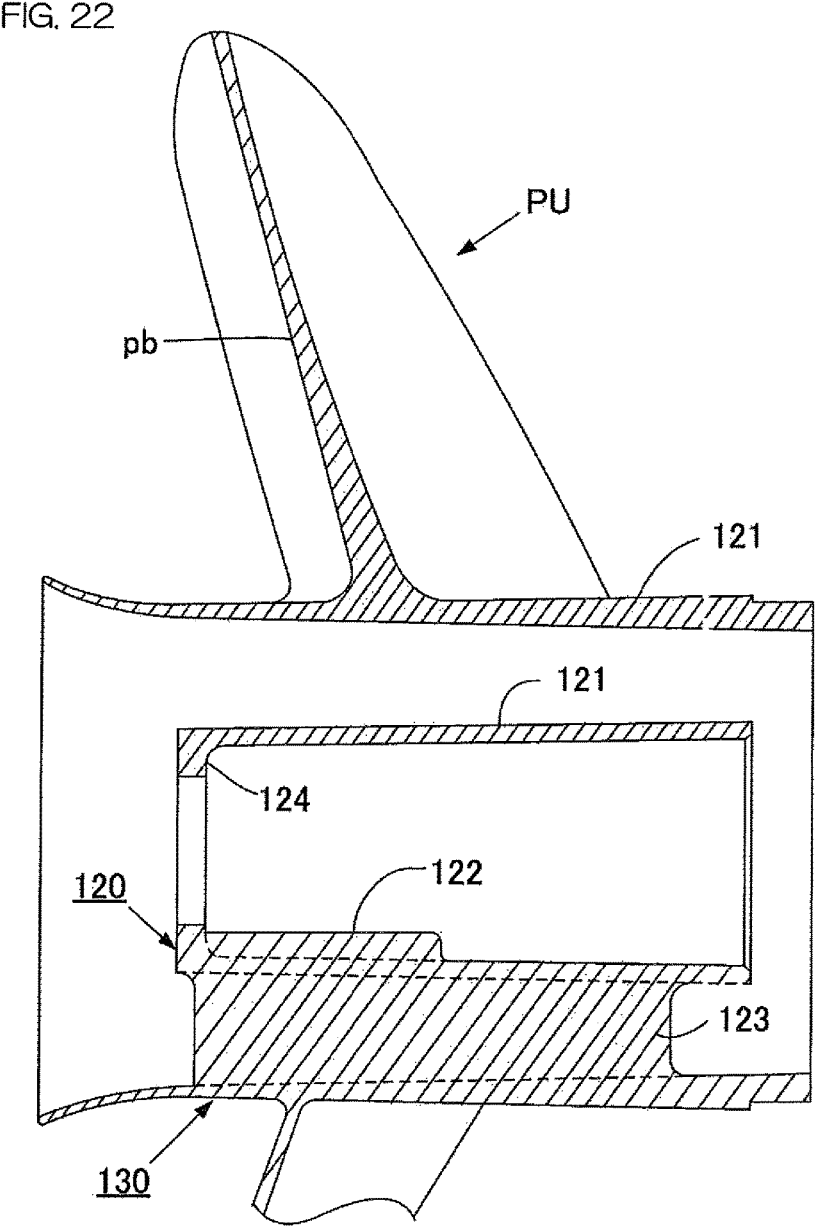
FIG. 22 is a longitudinal sectional view of an outer hub and an inner hub according to a fourth preferred embodiment of the present invention.

FIG. 22 to FIG. 25 show a propeller unit PU according to a fourth preferred embodiment of the present invention. As shown in FIG. 22, the propeller unit PU according to the fourth preferred embodiment of the present invention includes an inner hub 120 and an outer hub 130 in the same manner as in the first preferred embodiment of the present invention.

Figure 23:
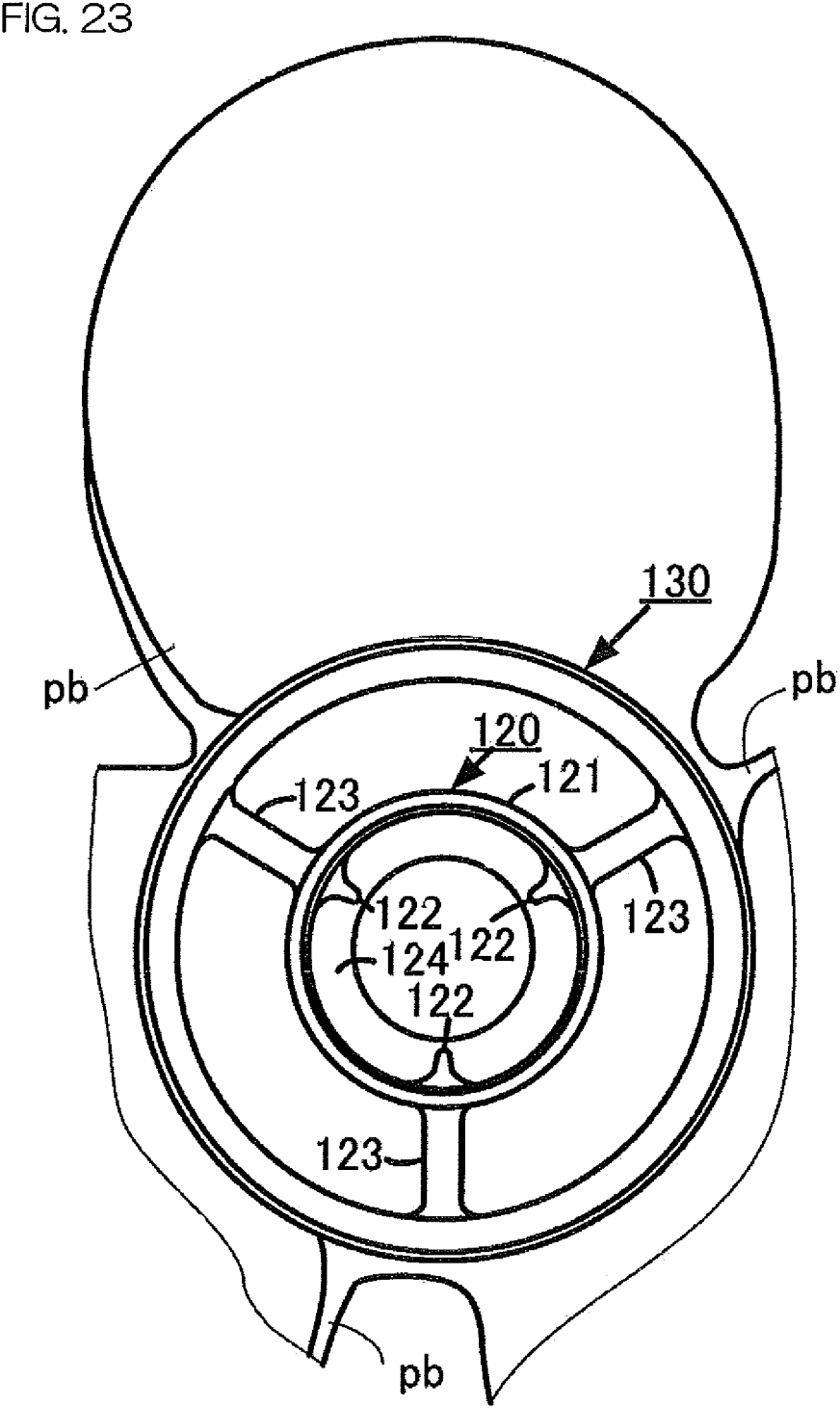
FIG. 23 is a rear view of the outer hub and the inner hub of FIG. 22 as seen from a rear end portion of the outer hub and from a rear end portion of the inner hub, a portion of the outer and inner hubs being eliminated.

As shown in FIG. 22 and FIG. 23, the inner hub 120 includes a cylindrical main body 121 and three ribs 122 that protrude inwardly in the radial direction from the cylindrical main body 121. The three ribs 122 are preferably equally spaced apart in the circumferential direction on the inner peripheral surface of the cylindrical main body 121. Each rib 122 extends in the axial direction.

As shown in FIG. 23, the propeller unit PU includes three connection pieces 123 that extend in the radial direction from the outer peripheral surface of the cylindrical main body 121 of the inner hub 120 to the inner peripheral surface of the outer hub 130. The three connection pieces 123 are disposed between the inner hub 120 and the outer hub 130. The inner hub 120 is connected integrally with the inner side of the outer hub 130 through the three connection pieces 123 in a state of being coaxially disposed. Therefore, the inner hub 120 and the outer hub 130 rotate together with each other. As shown in FIG. 22, the cylindrical main body 121 is tapered so that its radius becomes smaller from the front of the propeller unit PU toward the rear of the propeller unit PU.

As shown in FIG. 22, the inner hub 120 of the propeller unit PU includes a flange 124 that extends inwardly in the radial direction. The flange 124 is disposed at a rear edge of the inner hub 120. When a bushing 140 is inserted into the inner hub 120 from in front of the inner hub 120, the rear end portion of the bushing 140 comes into contact with the flange 124. As a result, locating the bushing 140 in the axial direction is performed in a state in which the bushing 140 is disposed in the inner hub 120. In other words, the leftward movement of the bushing 140 in FIG. 22 is restricted by contact with the bushing 140 and with the flange 124.

The outer hub 130 is cylindrical or substantially cylindrical. The outer hub 130 includes a cylindrical main body that surrounds the inner hub 120 and three blades pb integral with the cylindrical main body. The three blades pb are equally spaced apart in the circumferential direction. Each blade pb extends outwardly in the radial direction from the cylindrical main body.

Figure 24:
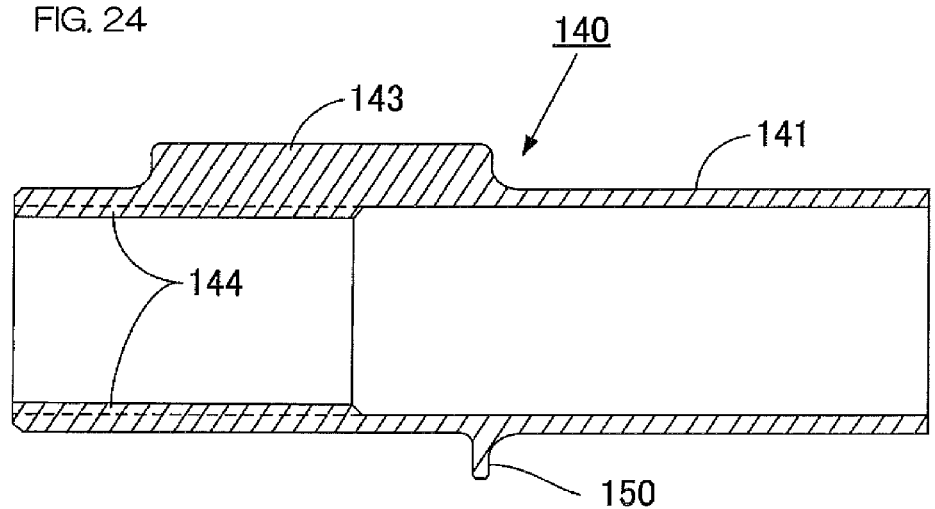
FIG. 24 is a longitudinal sectional view of a bushing according to the fourth preferred embodiment of the present invention.
Figure 25:
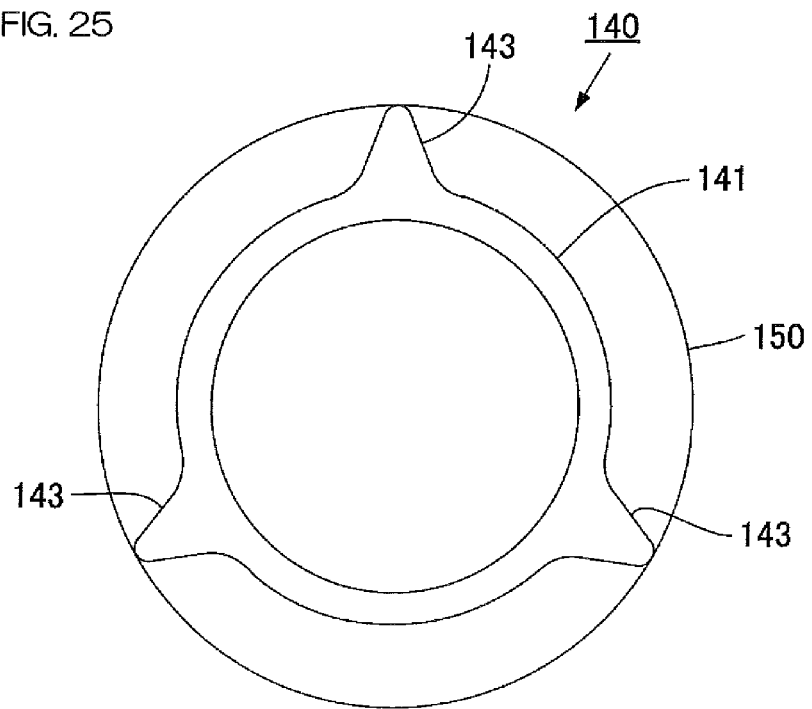
FIG. 25 is a rear view of the bushing of FIG. 24 as seen from a rear end portion of the bushing.

As shown in FIG. 24 and FIG. 25, the bushing 140 includes a cylindrical bushing body 141 and three ribs 143 that protrude outwardly in the radial direction from the bushing body 141.

As shown in FIG. 25, each rib 143 of the bushing 140 includes a tapered cross-section that is reduced in width in the circumferential direction toward the outside in the radial direction. As a result, the volume of the bushing 140 is reduced. Therefore, the material cost and the weight of the bushing 140 is reduced. Additionally, each rib 143 has a tapered shape, and, as a result, an additional deformation-absorbing space is provided between the rib 143 and the damper D when the rib 143 engages the damper D. This additional deformation-absorbing space further improves shock absorbability.

As shown in FIG. 24, the bushing 140 includes an outer flange 150 that protrudes outwardly in the radial direction from the bushing body 141. The outer flange 150 is disposed on the outer peripheral surface of the bushing body 141. As is understood from a combination of FIG. 24 and FIG. 25, each rib 143 of the bushing 140 extends forwardly from the outer flange 150, and is continuous with the outer flange 150. When the damper D is fitted to the outer peripheral surface of the bushing 140, an end portion of the damper D comes into contact with the outer flange 150, and the damper D is positioned. In the bushing 140 according to the fourth preferred embodiment of the present invention, a rotation restricting projection portion, which is provided in the first preferred embodiment of the present invention, is not provided.

The bushing 140 is spline-coupled with the propeller shaft 4. In other words, as shown in FIG. 24, the bushing body 141 includes an involute spline portion 144 that is spline-coupled with the spline shaft portion 4c of the propeller shaft 4. The involute spline portion 144 is disposed at the inner peripheral portion of the bushing body 141.

The propeller shaft 4 is inserted into the bushing body 141 from in front of the bushing body 141 through the first spacer 50, and the spline shaft portion 4c of the propeller shaft 4 is spline-coupled with the involute spline portion 144. In this state, the propeller shaft 4 and the bushing 140 rotate together with each other in the circumferential direction.

A second spacer, a washer, and a castle nut are disposed at the male screw portion 4d of the propeller shaft 4 in the same manner as in the first preferred embodiment of the present invention. The second spacer, the washer, and the castle nut are arranged in the same manner as in the first preferred embodiment of the present invention, and thus a description of this arrangement is omitted.

When the bushing 140 is fitted into the inner hub 120, the shock absorber A1 is attached to the outer periphery of the rear end portion of the bushing 140. In a state in which the shock absorber A1 has been attached to the bushing 140, the bushing 140 is inserted into the cylindrical main body 121 of the inner hub 120 from the front end portion side of the inner hub 20. The attachment of the shock absorber A1 to the bushing 140, the structure of the shock absorber A1, the operational effect of the shock absorber A1, etc., are the same as those of the first preferred embodiment of the present invention, and thus a description thereof is omitted. As a matter of course, the shock absorbers A2 and A3 are used instead of the shock absorber A1.

Fifth Preferred Embodiment

Next, a fifth preferred embodiment of the present invention will be described. In FIG. 26 to FIG. 29 below, the same reference character as in FIG. 1 to FIG. 25 is given to a component equivalent to each component shown in FIG. 1 to FIG. 25, and a description of these components is omitted.

Figure 26:
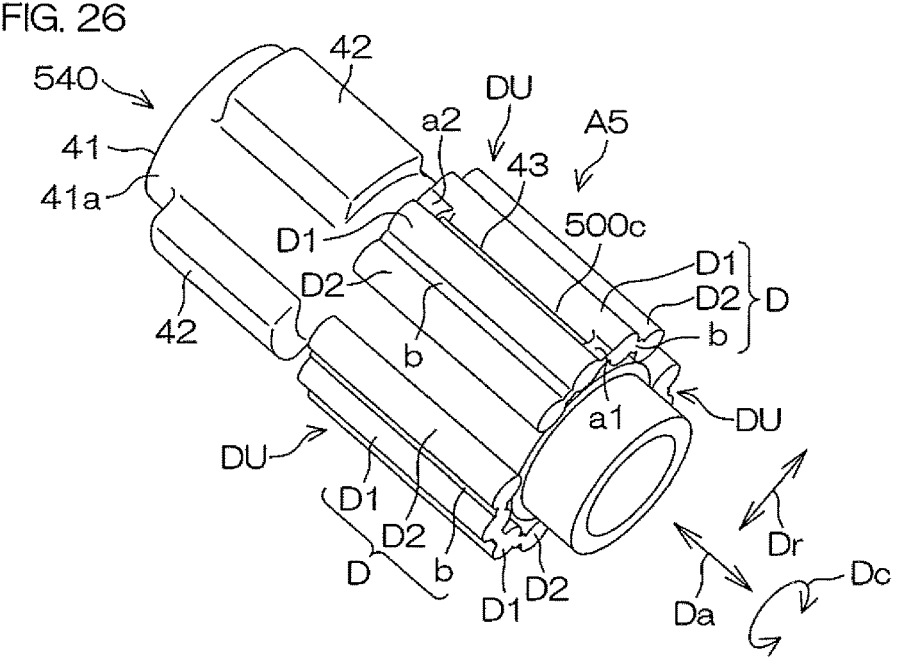
FIG. 26 is a perspective view of a bushing and a damper according to a fifth preferred embodiment of the present invention.

A propeller unit according to the fifth preferred embodiment of the present invention includes the inner hub 20, the connection piece 23, and the outer hub 30 according to the first preferred embodiment of the present invention. As shown in FIG. 26, the propeller unit according to the fifth preferred embodiment of the present invention additionally includes a bushing 540 and a shock absorber A5 according to the fifth preferred embodiment of the present invention instead of the bushing 40 and the shock absorber A1 according to the first preferred embodiment of the present invention.

Figure 27:
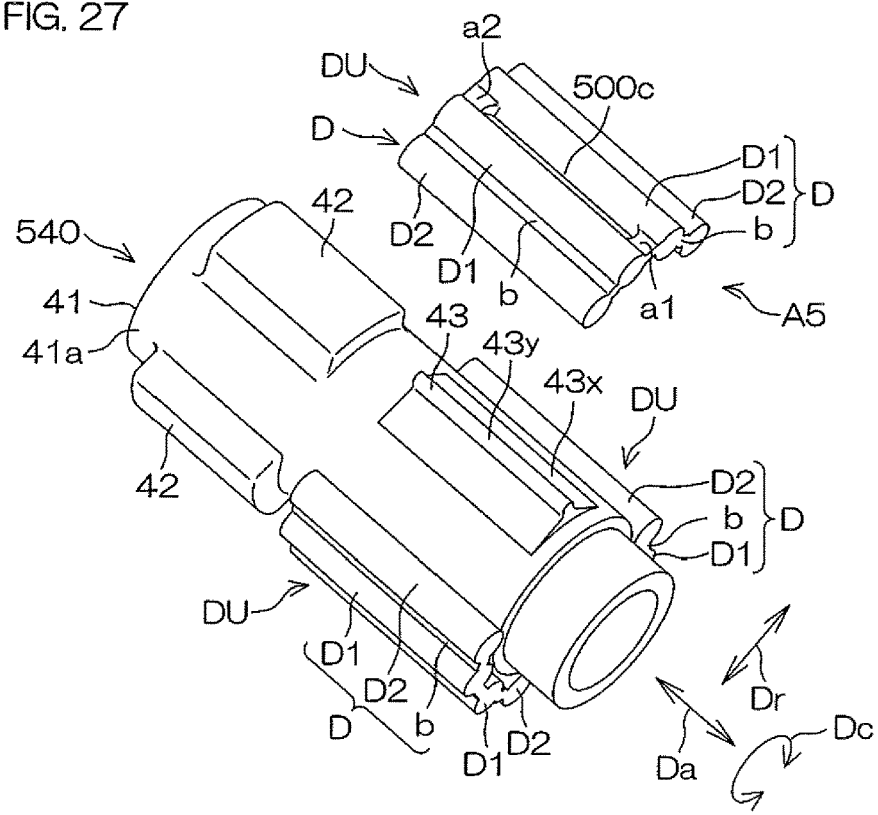
FIG. 27 is a perspective view of the damper according to the fifth preferred embodiment of the present invention that has not yet been attached to the bushing.

As shown in FIG. 27, the bushing 540 includes the cylindrical bushing body 41 that is spline-coupled with the spline shaft portion 4c (see FIG. 3) of the propeller shaft 4, the plurality of (e.g., three) rotation restricting projection portions 42 that protrude outwardly in the radial direction from the bushing body 41, and the plurality of (e.g., three) ribs 43 that protrude outwardly in the radial direction from the bushing body 41.

As shown in FIG. 27, the three rotation restricting projection portions 42 of the bushing 540 are spaced apart in the circumferential direction Dc. Likewise, the three ribs 43 are spaced apart in the circumferential direction Dc. The rotation restricting projection portion 42 is disposed behind the rib 43. The rotation restricting projection portion 42 and the rib 43 extend in the axial direction Da on the outer peripheral surface of the bushing body 41. The rib 43 is longer than the rotation restricting projection portion 42 in the axial direction Da (i.e., in the front-rear direction).

As shown in FIG. 29, each rib 43 of the bushing 540 includes a tapered cross-section that is reduced in width in the circumferential direction Dc toward the outside in the radial direction. The rib 43 includes a root portion 43x that protrudes outwardly in the radial direction from the bushing body 41 and an apex portion 43y that protrudes outwardly in the radial direction from the root portion 43x. A center line of the bushing 540 denotes a center line of the bushing body 41. The width of the root portion 43x in the circumferential direction Dc becomes smaller in proportion as it extends in the radial direction Dr away from the center line of the bushing 540. Likewise, the width of the apex portion 43y in the circumferential direction Dc becomes smaller in proportion as it extends in the radial direction Dr away from the center line of the bushing 540. The width of the apex portion 43y in the circumferential direction Dc is smaller than the width of the root portion 43x in the circumferential direction Dc. As shown in FIG. 27, the length of the apex portion 43y in the axial direction Da is equal or substantially equal to the length of the root portion 43x in the axial direction Da. The apex portion 43y may be longer or shorter than the root portion 43x in the axial direction Da.

As shown in FIG. 27, the three ribs 43 of the bushing 540 correspond to the three rotation restricting projection portions 42, respectively. The pair of rotation restricting projection portions 42 and the rib 43 are arranged side-by-side in the axial direction Da. The pair of rotation restricting projection portions 42 and the rib 43 are spaced apart from each other in the axial direction Da. As shown in FIG. 26, a portion of the shock absorber A5 is disposed between the pair of rotation restricting projection portions 42 and the rib 43. As shown in FIG. 27, the pair of rotation restricting projection portions 42 and the rib 43 are disposed so that the phase of the center of the rotation restricting projection portion 42 in the circumferential direction Dc coincides with that of the center of the rib 43 in the circumferential direction Dc. The phase denotes the rotation angle around the center line of the bushing 540. Therefore, the center of the rotation restricting projection portion 42 in the circumferential direction Dc and the center of the rib 43 in the circumferential direction Dc are located at the same position in the circumferential direction Dc. The width of the rotation restricting projection portion 42 in the circumferential direction Dc is greater than the width of the rib 43 in the circumferential direction Dc.

As shown in FIG. 26, the shock absorber A5 includes a plurality of (e.g., three) damper units DU that are spaced apart in the circumferential direction Dc of the bushing 540 on the outer peripheral surface of the bushing 540. Each damper unit DU is preferably an integral and unitary member made of an elastic material such as natural rubber.

As shown in FIG. 28, the damper unit DU according to the fifth preferred embodiment of the present invention includes a plate-shaped second connection arm a2 by which second end portions (in FIG. 28, right-hand end portions) of the pair of dampers D and D in the axial direction Da of the bushing 540 are connected to each other, in addition to the pair of dampers D and D and the first connection arm a1 according to the first preferred embodiment of the present invention. Therefore, the first end portion and the second end portion of the damper D are connected to the first connection arm a1 and the second connection arm a2, respectively. The first end portion and the second end portion of the damper D denote mutually-opposite portions of the damper D.

As shown in FIG. 28 and FIG. 29, each damper unit DU according to the fifth preferred embodiment of the present invention includes the first elastic member D1, the second elastic member D2, and the connection piece b according to the first preferred embodiment of the present invention. Each of the first and second elastic members D1 and D2 has, for example, a cylindrical or substantially cylindrical shape extending in the axial direction Da. The thickness of the connection piece b (i.e., length in the radial direction Dr) is smaller than the diameter of the first elastic member D1 and the diameter of the second elastic member D2. If the thickness of the connection piece b is smaller than the diameter of the first elastic member D1 and the second elastic member D2, the connection piece b may have the shape of a plate or may have shapes other than a plate. For example, as shown in FIG. 29, the outer surface of the connection piece b may swell outwardly in the radial direction. Likewise, the inner surface of the connection piece b may swell inwardly in the radial direction.

As shown in FIG. 28, each damper unit DU includes a pair of second elastic members D2 disposed in parallel or substantially in parallel with each other in a posture of extending in the axial direction Da, a pair of first elastic members D1 disposed between the pair of second elastic members D2 in the circumferential direction Dc, and a connection piece b by which the first and second elastic members D1 and D2 facing each other in the circumferential direction Dc are connected to each other. Each damper unit DU additionally includes a first connection arm a1 by which first end portions (in FIG. 28, left-hand end portions) of the pair of first elastic members D1 in the axial direction Da are connected to each other and a second connection arm a2 by which second end portions (in FIG. 28, right-hand end portions) of the pair of first elastic members D1 in the axial direction Da are connected to each other.

As shown in FIG. 29, the first connection arm a1 and the second connection arm a2 of the damper unit DU are disposed between the pair of first elastic members D1 in the circumferential direction Dc. As shown in FIG. 28, each of the first and second connection arms a1 and a2 is shorter than the first elastic member D1 in the axial direction Da. The first connection arm a1 and the second connection arm a2 are spaced apart from each other in the axial direction Da. The damper unit DU defines an insertion hole 500c, whose whole circumference is closed, by the pair of first elastic members D1, by the first connection arm a1, and by the second connection arm a2. As shown in FIG. 26, the rib 43 of the bushing 540 is inserted in the insertion hole 500c that is used as a non-connection portion.

FIG. 28 shows the damper unit DU being in a free state. The free state denotes a state in which the damper unit DU has not been deformed elastically. Therefore, FIG. 28 shows a state in which the damper unit DU has not yet been attached to the bushing 540. The thick chain double-dashed line in FIG. 28 represents the apex portion 43y of the rib 43. As shown in FIG. 28, the interval d1 between the pair of first elastic members D1 in the circumferential direction Dc in a free state, i.e., the width of the insertion hole 500c is greater than the width Wr of the apex portion 43y of the rib 43 in the circumferential direction Dc. On the contrary, the interval d1 between the pair of first elastic members D1 in the circumferential direction Dc in a free state is smaller than the width of the root portion 43x of the rib 43 in the circumferential direction Dc.

As shown in FIG. 28, the length Ld of the insertion hole 500c in the axial direction Da in a free state is smaller than the length Lr of the rib 43 in the axial direction Da. More specifically, the length Ld of the insertion hole 500c in the axial direction Da in a free state is smaller than the length Lr of the apex portion 43y of the rib 43 in the axial direction Da. Therefore, the interval Ld between the first connection arm a1 and the second connection arm a2 in the axial direction Da in a free state is smaller than the length Lr of the rib 43 in the axial direction Da.

The damper unit DU is disposed on the outer peripheral surface of the bushing 540 by a person such that the rib 43 of the bushing 540 is inserted into the insertion hole 500c of the damper unit DU. As described above, the length of the insertion hole 500c in the axial direction Da in a free state is smaller than the length of the rib 43 of the bushing 540 in the axial direction Da. Therefore, the damper unit DU is disposed on the outer peripheral surface of the bushing 540 in a state in which the insertion hole 500c has been pressed and expanded by a person in the axial direction Da so that the interval between the first and second connection arms a1 and a2 is spread. Therefore, the damper unit DU is attached to the bushing 540 in an elastically deformed state. As a result, the rib 43 of the bushing 540 is inserted in the insertion hole 500c of the damper unit DU.

After the rib 43 of the bushing 540 is inserted in the insertion hole 500c of the damper unit DU, the damper unit DU is separated from the person's hands. Therefore, the damper unit DU attempts to return to the original shape by an elastic restoring force. The first connection arm a1 and the second connection arm a2 attempt to approach the axial direction Da by the restoring force of the damper unit DU. The rib 43 of the bushing 540 is disposed between the first connection arm a1 and the second connection arm a2 in the axial direction Da. Therefore, the first connection arm a1 and the second connection arm a2 come into close contact with the rib 43 of the bushing 540, and the rib 43 of the bushing 540 is sandwiched between the first connection arm a1 and the second connection arm a2 in the axial direction Da. Accordingly, the first connection arm a1 and the second connection arm a2 prevent the damper unit DU from falling off the bushing 540.

The rib 43 of the bushing 540 is inserted in the insertion hole 500c of the damper unit DU in this manner. Both the first connection arm a1 and the second connection arm a2 are disposed on the damper unit DU, and thus the insertion hole 500c of the damper unit DU is closed over the whole circumference of the insertion hole 500c. Therefore, the bushing 540 and the damper unit DU are restricted in their relative movements by contact between the inner surface of the insertion hole 500c and the outer surface of the rib 43. Therefore, the damper unit DU is not easily deviated with respect to the bushing 540.

Additionally, the insertion hole 500c being in a free state is smaller than the rib 43 of the bushing 540, and thus the damper unit DU is attached to the bushing 540 in an elastically deformed state. Therefore, when the attachment of the damper unit DU to the bushing 540 is completed, the inner surface of the insertion hole 500c of the damper unit DU is brought into close contact with the rib 43 of the bushing 540 by a restoring force of the damper unit DU. As a result, the rib 43 of the bushing 540 is brought into a sandwiched state by the damper unit DU. Therefore, the damper unit DU is prevented from falling off the bushing 540.

As shown in FIG. 29, each damper unit DU is disposed between the outer peripheral surface of the bushing 540 and the inner peripheral surface of the inner hub 20. A plurality of damper units DU are spaced apart in the circumferential direction Dc between the bushing 540 and the inner hub 20 in the radial direction Dr. The rib 43 of the bushing 540 is disposed between a pair of first elastic members D1. Each rib 22 of the inner hub 20 is disposed in a space S between the two damper units DU adjacent to each other in the circumferential direction Dc. A portion facing the rib 43 of the bushing 540 in each damper D in the circumferential direction defines a "first portion D1" according to the fifth preferred embodiment of the present invention. A portion facing the rib 22 of the inner hub 20 in each damper D in the circumferential direction defines a "second portion D2" according to the fifth preferred embodiment of the present invention.

FIG. 29 shows a state in which a rotational force by which the bushing 540 and the inner hub 20 are relatively rotated has not been applied to the bushing 540 and to the inner hub 20. In this state, the damper D defines deformation-absorbing spaces S1 and S2 between the first portion D1 and the second portion D2. When a rotational force is applied between the bushing 540 and the inner hub 20 so that the rib 43 of the bushing 540 and the rib 22 of the inner hub 20 relatively move in the circumferential direction Dc, the damper D is compressed in the circumferential direction Dc between both ribs 43 and 22 by the ribs 43 and 22, and the deformation-absorbing spaces S1 and S2 are deformed.

As shown in FIG. 29, the length L1 of the first portion D1 in the radial direction Dr is preferably equal or substantially equal to the interval in the radial direction Dr between an outer peripheral surface 540a of the bushing 540 and an inner peripheral surface 20a of the inner hub 20. Likewise, the length L2 of the second portion D2 in the radial direction Dr is preferably equal or substantially equal to the interval in the radial direction Dr between the outer peripheral surface 540a of the bushing 540 and the inner peripheral surface 20a of the inner hub 20. Therefore, the damper D includes a filling portion (first portion D1 and second portion D2) with which a space between the outer peripheral surface 540a of the bushing 540 and the inner peripheral surface 20a of the inner hub 20 is filled in the radial direction Dr. The outer peripheral surface 540a of the bushing 540 is a portion in which the rib 43 in the outer periphery of the bushing 540 is not provided, whereas the inner peripheral surface 20a of the inner hub 20 is a portion in which the rib 22 in the outer periphery of the inner hub 20 is not provided.

As shown in FIG. 29, the damper D includes a connection piece b by which the first portion D1 and the second portion D2 are connected to each other. The length Lb of the connection piece b in the radial direction Dr is smaller than the length L1 of the first portion D1 in the radial direction Dr, and is smaller than the length L2 of the second portion D2 in the radial direction Dr. Therefore, the length Lb of the connection piece b in the radial direction Dr is smaller than the interval in the radial direction Dr between the outer peripheral surface 540a of the bushing 540 and the inner peripheral surface 20a of the inner hub 20. Therefore, the damper D includes a non-filling portion (connection portion b) that faces the outer peripheral surface 540a of the bushing 540 in the radial direction Dr with an interval therebetween and that faces the inner peripheral surface 20a of the inner hub 20 in the radial direction Dr with an interval therebetween.

As shown in FIG. 29, the first portion D1 includes a facing surface D1a that faces the rib 43 of the bushing 20 in the circumferential direction Dc. Likewise, the second portion D2 includes a facing surface D2a that faces the rib 22 of the inner hub 20 in the circumferential direction Dc. When a rotational force by which the bushing 540 and the inner hub 20 are relatively rotated is applied to the bushing 540 and to the inner hub 20, the facing surface D1a of the first portion D1 is in contact with the rib 43 of the bushing 20, and the facing surface D2a of the second portion D2 is in contact with the rib 22 of the inner hub 20. When this rotational force is not applied to the bushing 540 and to the inner hub 20, the facing surface D1a of the first portion D1 may be in contact with the rib 43 of the bushing 20, or may not be in contact therewith. Likewise, when this rotational force is not applied to the bushing 540 and to the inner hub 20, the facing surface D2a of the second portion D2 may be in contact with the rib 22 of the inner hub 20, or may not be in contact therewith.

Although the first to fifth preferred embodiments of the present invention have been described as above, the present invention is not limited to the contents of the above preferred embodiments, and can be variously modified within the scope of the present invention.

For example, as described above, both the first portion and the second portion of the damper are cylindrical or substantially cylindrical in the above preferred embodiments. However, at least one of the first and second portions may have a shape other than the cylindrical shape such as a prismatic shape.

Additionally, as described above, each of the rib of the inner hub and the rib of the bushing preferably has a triangular cross-sectional shape or substantially triangular cross-sectional shape that extends in the radial direction in the above preferred embodiments. However, at least one of the ribs of the inner hub and the bushing may have a rectangular cross-sectional shape or a substantially rectangular cross-sectional shape that extends in the radial direction. In other words, the width of the rib in the circumferential direction may be constant in at least one portion in the area ranging from the root of the rib to the apex of the rib.

Additionally, as described above, the vessel propulsion apparatus is preferably an outboard motor in the above preferred embodiments. However, the vessel propulsion apparatus may be an inboard/outboard motor, or may be an inboard motor.

The terms and expressions which have been used herein are used as terms of description and not of limitation, and there is no intention that in the use of such terms and expressions of excluding any equivalents of the features shown and described or portions thereof, but it is recognized that various modifications are possible within the scope of the present invention as defined by the appended claims.

While the present invention may be embodied in many different forms, a number of illustrative preferred embodiments are described herein with the understanding that the present disclosure is to be considered as providing examples of the principles of the invention and such examples are not intended to limit the present invention to preferred embodiments described herein and/or illustrated herein.

While illustrative preferred embodiments of the present invention have been described herein, the present invention is not limited to the various preferred embodiments described herein, but includes any and all preferred embodiments having equivalent elements, modifications, omissions, combinations (e.g., of aspects across various preferred embodiments), adaptations and/or alterations as would be appreciated by those in the art based on the present disclosure. The limitations in the claims are to be interpreted broadly based on the language used in the claims and not limited to preferred embodiments described in the present specification or during the prosecution of the application, which preferred embodiments are to be construed as non-exclusive. For example, in the present disclosure, the term "preferably" is non-exclusive and means "preferably, but not limited to."

The present application corresponds to Japanese Patent Application No. 2013-009284 filed in the Japan Patent Office on Jan. 22, 2013, and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A propeller unit for connection to a propeller shaft of a vessel propulsion apparatus, the propeller unit comprising:
   an inner hub that includes a rib provided on an inner peripheral surface of the inner hub;
   an outer hub that is disposed and connected to the inner hub coaxially with the inner hub and that includes a plurality of blades provided on an outer peripheral surface of the outer hub;
   a bushing for connection to the propeller shaft and that includes a rib provided on an outer peripheral surface of the bushing; and
   a shock absorber to be driven by the propeller shaft and that includes a damper made of an elastic material, the damper being disposed between the outer peripheral surface of the bushing of the propeller unit and the inner peripheral surface of the inner hub of the propeller unit, the damper including:
      a first portion facing the rib of the bushing in a circumferential direction of the bushing;
      a second portion facing the rib of the inner hub in the circumferential direction; and
      a connector by which the first portion and the second portion are connected to each other; wherein
   neither the rib of the inner hub nor the rib of the bushing is located between the first portion of the damper and the second portion of the damper;
   a deformation-absorbing space is defined between the first portion and the second portion in a state in which the damper has not been elastically deformed by relative rotation between the bushing and the inner hub;

the deformation-absorbing space is deformable such that the first portion and the second portion approach each other in a state in which the damper has been elastically deformed by relative rotation between the bushing and the inner hub;

the inner hub includes a flange that is disposed at a rear end of the inner hub, extends inwardly in the radial direction, and restricts a movement of the bushing in an axial direction of the inner hub by contact between the flange and the bushing; and the first portion is cylindrical and the second portion is cylindrical.

2. The propeller unit according to claim 1, further comprising a plurality of the deformation-absorbing spaces extending in the axial direction.

3. The propeller unit according to claim 1, wherein, in a cross-section perpendicular or substantially perpendicular to the axial direction, a cross-sectional area of the deformation-absorbing space is within a range of about 30% to about 80% of a cross-sectional area of the damper.

4. The propeller unit according to claim 1, wherein the shock absorber further includes a plurality of dampers spaced apart in the circumferential direction on the outer peripheral surface of the bushing.

5. The propeller unit according to claim 1, wherein the shock absorber further includes:
  a pair of dampers that are disposed on the outer peripheral surface of the bushing and are spaced apart in the circumferential direction; and
  a first connection arm by which first ends of the pair of dampers are connected to each other in the axial direction of the bushing.

6. The propeller unit according to claim 5, wherein the shock absorber further includes a second connection arm by which second ends of the pair of dampers in the axial direction of the bushing are connected to each other.

7. The propeller unit according to claim 1, wherein the shock absorber includes an integral and unitary cylindrical member in which a plurality of dampers are integrally connected to each other in the circumferential direction.

8. The propeller unit according to claim 7, wherein
  the deformation-absorbing space includes a first concave portion that extends inwardly in the radial direction from an outer peripheral surface of the cylindrical member; and
  the first concave portion extends in the axial direction from a first end of the cylindrical member in the axial direction toward a second end of the cylindrical member in the axial direction.

9. The propeller unit according to claim 7, wherein
  the deformation-absorbing space includes a second concave portion that extends outwardly in the radial direction from an inner peripheral surface of the cylindrical member; and
  the second concave portion extends in the axial direction from a first end of the cylindrical member in the axial direction toward a second end of the cylindrical member in the axial direction.

10. The propeller unit according to claim 7, wherein the deformation-absorbing space includes:
  a first concave portion that extends inwardly in the radial direction from an outer peripheral surface of the cylindrical member and that extends in the axial direction from a first end of the cylindrical member in the axial direction toward a second end of the cylindrical member in the axial direction; and
  a second concave portion that extends outwardly in the radial direction from an inner peripheral surface of the cylindrical member and that extends in the axial direction from the first end of the cylindrical member toward the second end of the cylindrical member.

11. The propeller unit according to claim 7, wherein the damper includes a first concave portion that extends inwardly in the radial direction from an outer peripheral surface of the damper, and a second concave portion that extends outwardly in the radial direction from an inner peripheral surface of the damper;
  the first concave portion and the second concave portion are spaced apart from each other in the circumferential direction; and
  in a cross-section perpendicular to the axial direction, a cross-sectional area of the deformation-absorbing space is within a range of about 30% to about 80% of a space between the first concave portion and the second concave portion in the circumferential direction.

12. The propeller unit according to claim 1, wherein the rib of the inner hub has a cross-sectional shape that is tapered toward an inner end of the rib of the inner hub.

13. The propeller unit according to claim 1, wherein the inner hub includes a plurality of ribs spaced apart in the circumferential direction.

14. The propeller unit according to claim 1, wherein the bushing includes a plurality of ribs spaced apart in the circumferential direction.

15. The propeller unit according to claim 1, wherein the bushing includes spline teeth provided on the inner peripheral surface of the bushing to be spline-coupled to the propeller shaft.

16. A vessel propulsion apparatus comprising:
  an engine;
  a drive shaft rotated by the engine;
  a drive gear fixed to the drive shaft;
  a forward gear engaging the drive gear;
  a backward gear that rotates in a direction opposite to a rotational direction of the forward gear while engaging the drive gear;
  a dog clutch that selectively engages the forward gear and the backward gear;
  a propeller shaft rotated together with the dog clutch; and
  a propeller unit connected to the propeller shaft, the propeller unit including:
    an inner hub that includes a rib provided on an inner peripheral surface of the inner hub;
    an outer hub that is disposed and connected to the inner hub coaxially with the inner hub and that includes a plurality of blades provided on an outer peripheral surface of the outer hub;
    a bushing connected to the propeller shaft and that includes a rib provided on an outer peripheral surface of the bushing; and
    a shock absorber to be driven by the propeller shaft and that includes a damper made of an elastic material, the damper being disposed between the outer peripheral surface of the bushing of the propeller unit and the inner peripheral surface of the inner hub of the propeller unit, the damper including:
      a first portion facing the rib of the bushing in a circumferential direction of the bushing;
      a second portion facing the rib of the inner hub in the circumferential direction; and
      a connector by which the first portion and the second portion are connected to each other; wherein neither the rib of the inner hub nor the rib of the bushing is located between the first portion of the damper and the second portion of the damper;

a deformation-absorbing space is defined between the first portion and the second portion in a state in which the damper has not been elastically deformed by relative rotation between the bushing and the inner hub;

the deformation-absorbing space is deformable such that the first portion and the second portion approach each other in a state in which the damper has been elastically deformed by relative rotation between the bushing and the inner hub;

the inner hub includes a flange that is disposed at a rear end of the inner hub, extends inwardly in the radial direction, and restricts a movement of the bushing in an axial direction of the inner hub by contact between the flange and the bushing; and the first portion is cylindrical and the second portion is cylindrical.

17. A propeller unit for connection to a propeller shaft of a vessel propulsion apparatus, the propeller unit comprising:

an inner hub that includes a rib provided on an inner peripheral surface of the inner hub;

an outer hub that is disposed and connected to the inner hub coaxially with the inner hub and that includes a plurality of blades provided on an outer peripheral surface of the outer hub;

a bushing for connection to the propeller shaft and that includes a rib provided on an outer peripheral surface of the bushing; and a shock absorber to be driven by the propeller shaft and that includes a damper made of an elastic material, the damper being disposed between the outer peripheral surface of the bushing of the propeller unit and the inner peripheral surface of the inner hub of the propeller unit, the damper including:

a first portion facing the rib of the bushing in a circumferential direction of the bushing;

a second portion facing the rib of the inner hub in the circumferential direction; and a connector by which the first portion and the second portion are connected to each other; wherein neither the rib of the inner hub nor the rib of the bushing is located between the first portion of the damper and the second portion of the damper;

a deformation-absorbing space is defined between the first portion and the second portion in a state in which the damper has not been elastically deformed by relative rotation between the bushing and the inner hub;

the deformation-absorbing space is deformable such that the first portion and the second portion approach each other in a state in which the damper has been elastically deformed by relative rotation between the bushing and the inner hub;

the inner hub includes a flange that is disposed at a rear end of the inner hub, extends inwardly in the radial direction, and restricts a movement of the bushing in an axial direction of the inner hub by contact between the flange and the bushing; and a cylindrical main body of the inner hub is tapered such that a radius of the cylindrical main body becomes smaller from a front of the propeller unit towards a rear of the propeller unit.

18. The propeller unit according to claim 1, wherein the deformation-absorbing space is at least one of a first space and a second space;

the first space is defined by the first portion, the second portion, the connector, and the inner hub; and the second space is defined by the first portion, the second portion, the connector, and the bushing.

19. The vessel propulsion apparatus according to claim 16, wherein the deformation-absorbing space is at least one of a first space and a second space;

the first space is defined by the first portion, the second portion, the connector, and the inner hub; and the second space is defined by the first portion, the second portion, the connector, and the bushing.

20. The propeller unit according to claim 1, wherein the deformation-absorbing space is located between the first portion and the second portion in the circumferential direction of the bushing.

21. The vessel propulsion apparatus according to claim 16, wherein the deformation-absorbing space is located between the first portion and the second portion in the circumferential direction of the bushing.

* * * * *